(12) United States Patent
Denyer et al.

(10) Patent No.: US 10,896,160 B2
(45) Date of Patent: Jan. 19, 2021

(54) DISCOVERY AND MIGRATION PLANNING TECHNIQUES OPTIMIZED BY ENVIRONMENTAL ANALYSIS AND CRITICALITY

(71) Applicant: Secure-24, LLC, Southfield, MI (US)

(72) Inventors: Jacob Anthony Denyer, Canton, MI (US); Christopher Todd Deperro, Northville, MI (US); Nick Ilitch, Southfield, MI (US); Peter Anthony Bartusek, Bloomfield Hills, MI (US); Steven Joseph Dove, Clarkston, MI (US); Brett Ryan Streeter, Allen Park, MI (US)

(73) Assignee: Secure-24, LLC, Southfield, MI (US)

( * ) Notice: Subject to any disclaimer, the term of this patent is extended or adjusted under 35 U.S.C. 154(b) by 245 days.

(21) Appl. No.: 15/924,756

(22) Filed: Mar. 19, 2018

(65) Prior Publication Data
US 2019/0288915 A1 Sep. 19, 2019

(51) Int. Cl.
| | |
|---|---|
| G06F 16/21 | (2019.01) |
| G06F 9/54 | (2006.01) |
| G06F 16/25 | (2019.01) |
| H04L 29/08 | (2006.01) |
| H04L 12/24 | (2006.01) |

(Continued)

(52) U.S. Cl.
CPC ............ *G06F 16/214* (2019.01); *G06F 9/54* (2013.01); *G06F 16/2365* (2019.01); *G06F 16/252* (2019.01); *H04L 41/12* (2013.01); *H04L 63/20* (2013.01); *G06F 9/547* (2013.01); *H04L 41/22* (2013.01); *H04L 67/10* (2013.01)

(58) Field of Classification Search
CPC ......... H04L 41/12; H04L 41/22; H04L 67/10; H04L 63/20; G06F 16/254; G06F 9/547; G06F 16/252; G06F 9/54; G06F 16/2365
See application file for complete search history.

(56) References Cited

U.S. PATENT DOCUMENTS

| | | |
|---|---|---|
| 7,590,715 B1 | 9/2009 | Raanan |
| 8,244,853 B1 | 8/2012 | Raanan |
| 9,459,856 B2 | 10/2016 | Curzi et al. |

(Continued)

*Primary Examiner* — Tonia L Dollinger
*Assistant Examiner* — Joseph M Cousins
(74) *Attorney, Agent, or Firm* — Gregory D. DeGrazia

(57) ABSTRACT

Systems and methods for discovery of and planning migration for computing nodes are provided. At least one collector node is deployed at a source location network to discover data associated with computing nodes of a source infrastructure. The data is transmitted to a staging API. A migration processing API receives the discovered data from the staging API after satisfying an access control measure and writes the discovered data to a migration database. A migration planning API analyzes the discovered data written to the migration database by applying a criticality algorithm to determine a criticality parameter associated with each of the computing nodes. The criticality parameter identifies a potential impact that each computing node has to migration. The migration planning API automatically groups the computing nodes into migration pods, prioritizes the migration pods based on the criticality parameters, and generates a plan for migrating the migration pods to a target infrastructure.

20 Claims, 9 Drawing Sheets

(51) Int. Cl.
*H04L 29/06* (2006.01)
*G06F 16/23* (2019.01)

(56) References Cited

U.S. PATENT DOCUMENTS

| | | | |
|---|---|---|---|
| 9,461,969 B2 | 10/2016 | Watt | |
| 2003/0172373 A1* | 9/2003 | Henrickson | G06F 8/63 |
| | | | 717/175 |
| 2014/0007204 A1* | 1/2014 | Branch | H04L 41/28 |
| | | | 726/5 |
| 2014/0222967 A1* | 8/2014 | Harrang | H04L 67/10 |
| | | | 709/219 |
| 2014/0278807 A1 | 9/2014 | Bohacek | |
| 2016/0094477 A1 | 3/2016 | Bai et al. | |
| 2016/0301565 A1* | 10/2016 | Zahid | H04L 45/02 |
| 2017/0093640 A1* | 3/2017 | Subramanian | H04L 41/12 |
| 2017/0310547 A1* | 10/2017 | Lin | G06F 16/22 |
| 2018/0136958 A1* | 5/2018 | Nagpal | G06F 9/45558 |
| 2019/0034297 A1* | 1/2019 | Basur Shankarappa | |
| | | | G06F 9/45558 |
| 2019/0179658 A1* | 6/2019 | Jones | G06F 16/27 |
| 2019/0286491 A1* | 9/2019 | Bohacek | G06F 9/5061 |
| 2019/0310881 A1* | 10/2019 | Gupta | G06F 9/5077 |
| 2020/0042427 A1* | 2/2020 | Bastianelli | G06F 11/3612 |

\* cited by examiner

DISCOVERY AND MIGRATION PLANNING TECHNIQUES OPTIMIZED BY ENVIRONMENTAL ANALYSIS AND CRITICALITY

TECHNICAL FIELD

The technical field relates generally to Information Technology (IT) and more specifically techniques computer-implemented techniques for discovery of computing nodes at one infrastructure and for planning migration of the computing nodes to another infrastructure.

BACKGROUND

Migration refers to the movement of technology from outdated or legacy infrastructure to updated infrastructure including newer hardware, applications, and operating systems. Infrastructure migration, in particular, is a highly complex and manual process that has an impact on several layers of computing platforms. Discovering which systems to migrate and planning the migration of the same is challenging.

Conventional techniques for migration discovery and planning are inefficient, unintelligent, and intrusive.

For example, many conventional migration techniques extract data from the source infrastructure haphazardly and redundantly by acquiring much irrelevant and duplicative data about the systems.

Many prior approaches further require agent-based monitoring at the source infrastructure wherein several agents are installed locally at the source network. These agents are intrusive and consume significant resources at the source network.

After data about the system is collected, conventional techniques fail to intelligently organize and prioritize the systems for planned migration. For example, prior approaches fail to foresee that certain systems, when migrated together, will cause latency, security risks, or even system failure during or after migration. Thus, prior approaches address migration in a one-dimensional manner, without taking into account environmental analysis to determine system criticality to migration and risks involved with migrating groups of systems.

Conventional approaches narrowly focus on the systems presently subject to migration, and fail to consider past migration experiences or lessons that could otherwise optimize migration or avoid major pitfalls. In turn, this inefficiency creates downstream costs that are passed to the customer. Furthermore, traditional techniques fail to address on-going modifications that may occur at the source infrastructure after initial discovery. As a result, migration planning does not reflect the most recent state of the source infrastructure causing such planning to be inaccurate and incomplete.

Confidentiality, authenticity, and integrity are also important factors to the discovery process and traditional techniques unsuccessfully address these factors throughout the duration and stream of the discovery process.

Conventional migration planning also falls short in many ways. For example, since prior attempts fail to address criticality and risk, they further fail to automatically provide intelligent planning and suggestions that mitigate such risks for migration.

As such, there is a need in the art for systems and methods for addressing at least the aforementioned problems associated with traditional techniques for migration discovery and planning.

SUMMARY AND ADVANTAGES

One embodiment of a computer-implemented system for discovery of computing nodes of a source infrastructure at a source location and for planning migration of the computing nodes to a target infrastructure at a target destination is provided. The system comprises a collector node configured for deployment at a network of the source location and being configured to discover data associated with computing nodes of the source infrastructure and to transmit the discovered data from the network of the source location. A staging application programming interface (API) is configured to receive the discovered data transmitted by the collector node and to apply an access control measure to the discovered data. A migration database is provided. A migration processing API is configured to satisfy the access control measure applied by the staging API, retrieve the discovered data from the staging API after satisfying the access control measure, and write the discovered data to the migration database. A migration planning API is configured to analyze the discovered data written to the migration database. The migration planning API implements a criticality algorithm to the discovered data to determine a criticality parameter associated with each of the discovered computing nodes. The criticality parameter identifies a potential impact that each discovered computing node has to migration. The migration planning API is configured to automatically group the discovered computing nodes of the source infrastructure into migration pods based analysis of the discovered data. Each migration pod defines a group of discovered computing nodes that depend on one another for network communication at the source infrastructure. The migration planning API is configured to prioritize the migration pods based on the criticality parameters of the discovered computing nodes of each migration pod and to generate a plan for migrating the one or more migration pods to the target infrastructure.

One embodiment of a computer-implemented method for discovery of computing nodes of a source infrastructure at a source location and for planning migration of the computing nodes to a target infrastructure at a target destination is provided. The method comprises deploying at least one collector node at a network of the source location and discovering, with the collector node, data associated with computing nodes of the source infrastructure. The method comprises transmitting, with the collector node, the discovered data from the network of the source location to a staging application programming interface (API) at a remote server and receiving, with the staging API, the discovered data transmitted by the collector node. The staging API applies an access control measure to the discovered data and a migration processing API satisfies the access control measure applied by the staging API. The migration processing API receives the discovered data from the staging API after satisfying the access control measure and writes the discovered data to a migration database. The method comprises analyzing, with a migration planning API, the discovered data written to the migration database, by applying a criticality algorithm to the discovered data to determine a criticality parameter associated with each of the discovered computing nodes, wherein the criticality parameter identifies a potential impact that each discovered computing node has to migration. The migration planning API automatically groups the discovered computing nodes of the source infrastructure into migration pods based analysis of the discovered data, and with each migration pod defining a group of discovered computing nodes that depend on one another for network communication at the source infrastructure. The migration planning API prioritizes the migration pods based on the criticality parameters of the discovered computing nodes of each migration pod and generates a plan for migrating the one or more migration pods to the target infrastructure.

The techniques described herein address challenges in discovering which systems to migrate and planning the migration of the same. The discovery and migration planning techniques described herein are efficient, intelligent, and less intrusive than prior methods. Data discovery by the collector node is precise and places minimal burden on the resources of the source network. The discovered data is intelligently organized and prioritized for planned migration. The techniques described herein intelligently foresee that certain systems, when migrated together, will cause latency, security risks, or even system failure during or after migration. Thus, the approaches described herein address migration in a multi-dimensional manner, taking into account environmental analysis to determine system criticality to migration and risks involved with migrating groups of systems.

Moreover, the discovery and migration planning techniques described herein account for past migration experiences or lessons that could otherwise optimize migration or avoid major pitfalls. In turn, this efficiency creates downstream cost savings that are passed to the customer. Furthermore, the techniques described herein addresses ongoing modifications that may occur at the source infrastructure after initial discovery. As a result, migration planning reflects the most recent state of the source infrastructure resulting in accurate and complete planning. Furthermore, the control access feature preserves confidentiality, authenticity, and integrity throughout the duration and stream of the discovery process. By analyzing criticality and risk, the techniques herein can automatically provide intelligent planning and suggestions that mitigate such risks for migration. As a result, a phased IT migration scheduling and planning risk migration platform is provided, which is optimized by discovery or environmental analysis.

Advantages other than those listed above can be readily understood in view of the subject disclosure and the state of the art.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Figure 1:
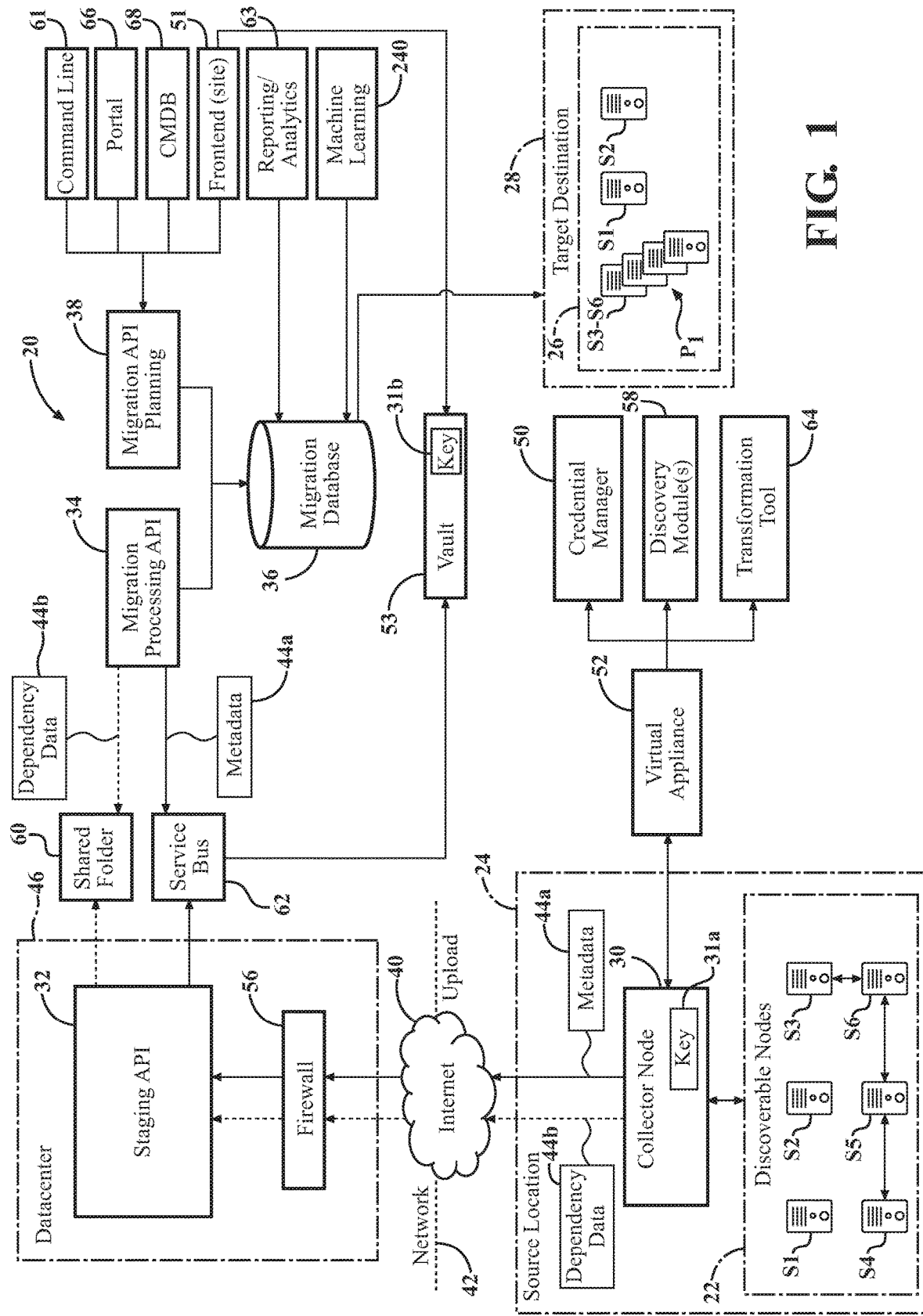
FIG. 1 is a diagram of one embodiment of an IT network or system according to one example.

Systems, computer-implemented techniques, and non-transitory computer readable media, and software programs are described herein for discovery and planning for migration of computing nodes.

Definitions for the certain terms utilized herein are provided as follows:

As utilized herein, "enterprise" is defined as a customer, organization, business, operation, corporation, or other entity that requires, wants, or requests services related to discovery and migration planning, or otherwise is subject of discovery and migration planning.

As utilized herein, "infrastructure" is defined as the assembly of physical and/or virtual resources that facilitate the flow, storage, processing, and analysis of data. Infrastructure includes collection of hardware, software, networks, data centers, and other equipment utilized by an enterprise. The infrastructure need not include all of the physical and virtual resources of the enterprise, but may be limited to certain facilities, locations, technical groups, or technical resources associated with the enterprise.

As utilized herein, "migration" in information technology, refers to the process of moving hardware and/or software technology from a source infrastructure to a destination infrastructure. Migration may comprise moving hardware and/or software technology from a source device to a target device. Migration is desired or required when the source infrastructure comprises legacy or outdated technology and the destination infrastructure includes newer or more updated hardware, applications, and operating systems. As used herein, the computing nodes are subject to migration. Therefore, the primary type of migration utilized herein includes infrastructure or system migration. However, other types of migration may be performed, including, but not limited to software, application, data, database, content, and cloud migration.

As utilized herein, "computing node" is subject to discovery and migration planning and defined by its meaning in information technology arts. The computing node is owned, operated, or managed by the enterprise. A computing node may be an independent or singularly or multiply dependent, parent, child or sibling device or point in a network. The computing node resides on a network and may reside at various locations on premise, hosted in private clouds and/or public clouds. Examples of the computing node include a physical and/or a virtual component, server, database, storage device, cloud (public or private), hypervisor, virtual machine, router, network devices, software, tools, services, applications, printer, computing device, laptop, desktop, virtual desktop, tablet, smart phone, personal computer, and the like. The computing node has an impact on migration, even if not migrated. For example, network routers or switches may not be migrated, but discovery of data from such computing nodes is relevant for purposes of understanding enterprise management of devices on the network or how computing nodes otherwise interact on the enterprise network.

As utilized herein, "application programming interface" or API is a set of code, commands, tools, protocols, functions, and/or objects that is programmed to interact or communicate with an external application. The API comprises a specification to define information exchange parameters between programs as well as a software interface. The API may be called or published. Examples of the API include a local API, web API, program API, and the like. Each of the APIs described herein may be implemented on a cloud network, and/or by the same or different servers.

As utilized herein, "source" is defined as a physical and/or virtual location, place, site from which things, such as computing nodes, information, and data, are obtained or otherwise discovered. The term "source location" refers to one or more physical and/or virtual locations of the enterprise.

As utilized herein, "target" is defined as a physical and/or virtual location, place, site to which things, such as computing nodes, information, and data, are migrated. The term "target destination" refers to one or more physical and/or virtual locations of an entity which receives, holds, monitors, or otherwise manages the migrated computing nodes. This entity can be the same enterprise, a different enterprise, a service provider or vendor, such as IT service provider, and more specifically, a migration service provider. The discovery and migration planning service provider may or may not manage the computing nodes at the target infrastructure after migration.

Referring to FIG. 1, the techniques described herein involve discovery of computing nodes S1-Sn of a source infrastructure 22 of an enterprise. The source infrastructure 22 is provided at a source location 24 of the enterprise. The techniques described herein further provide for planning migration of the computing nodes S1-Sn to a target infrastructure 26 provided at a target destination 28.

Figure 2A:
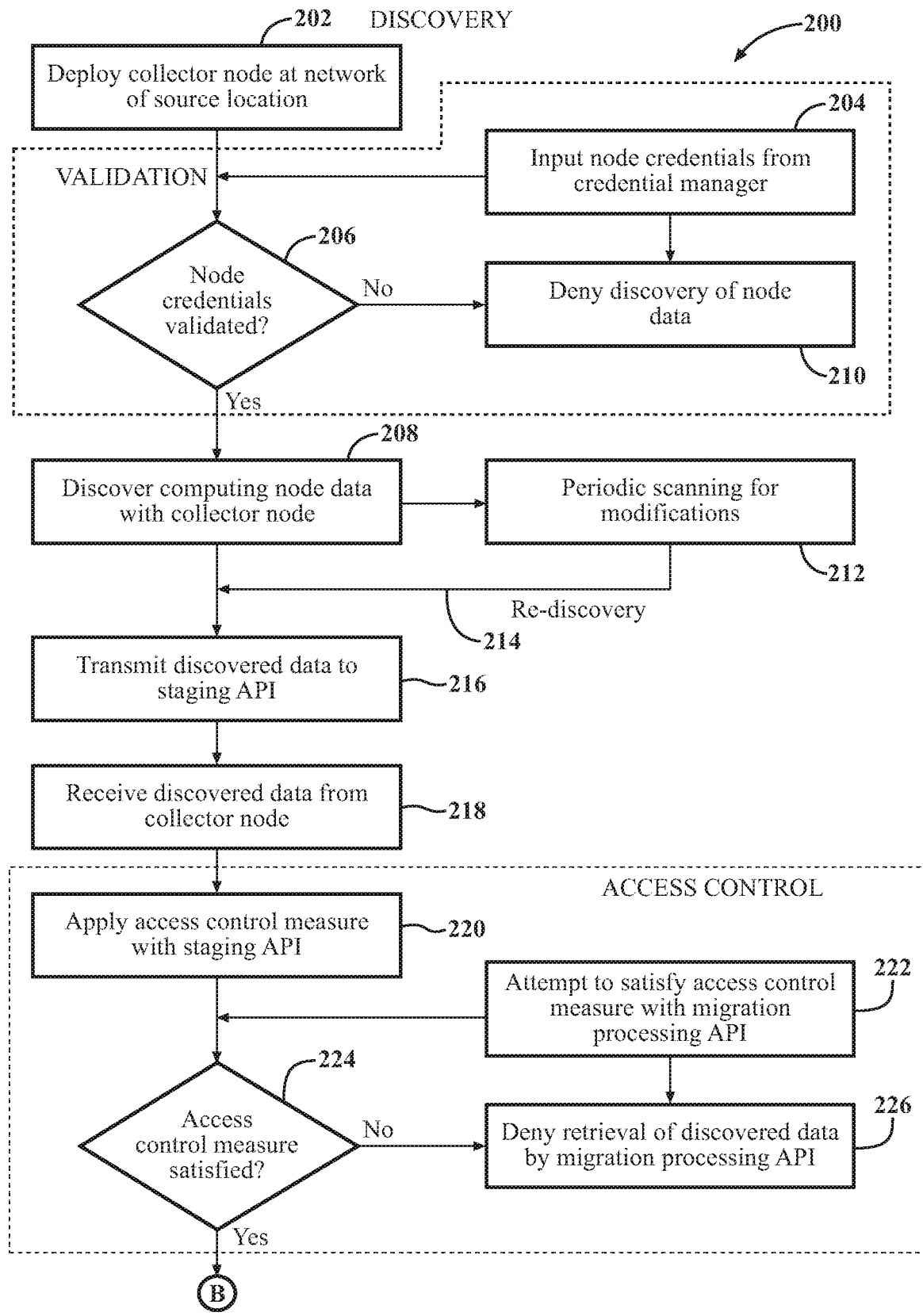
FIG. 2A is flowchart of various steps of the discovery process according to the techniques described herein.
Figure 2B:
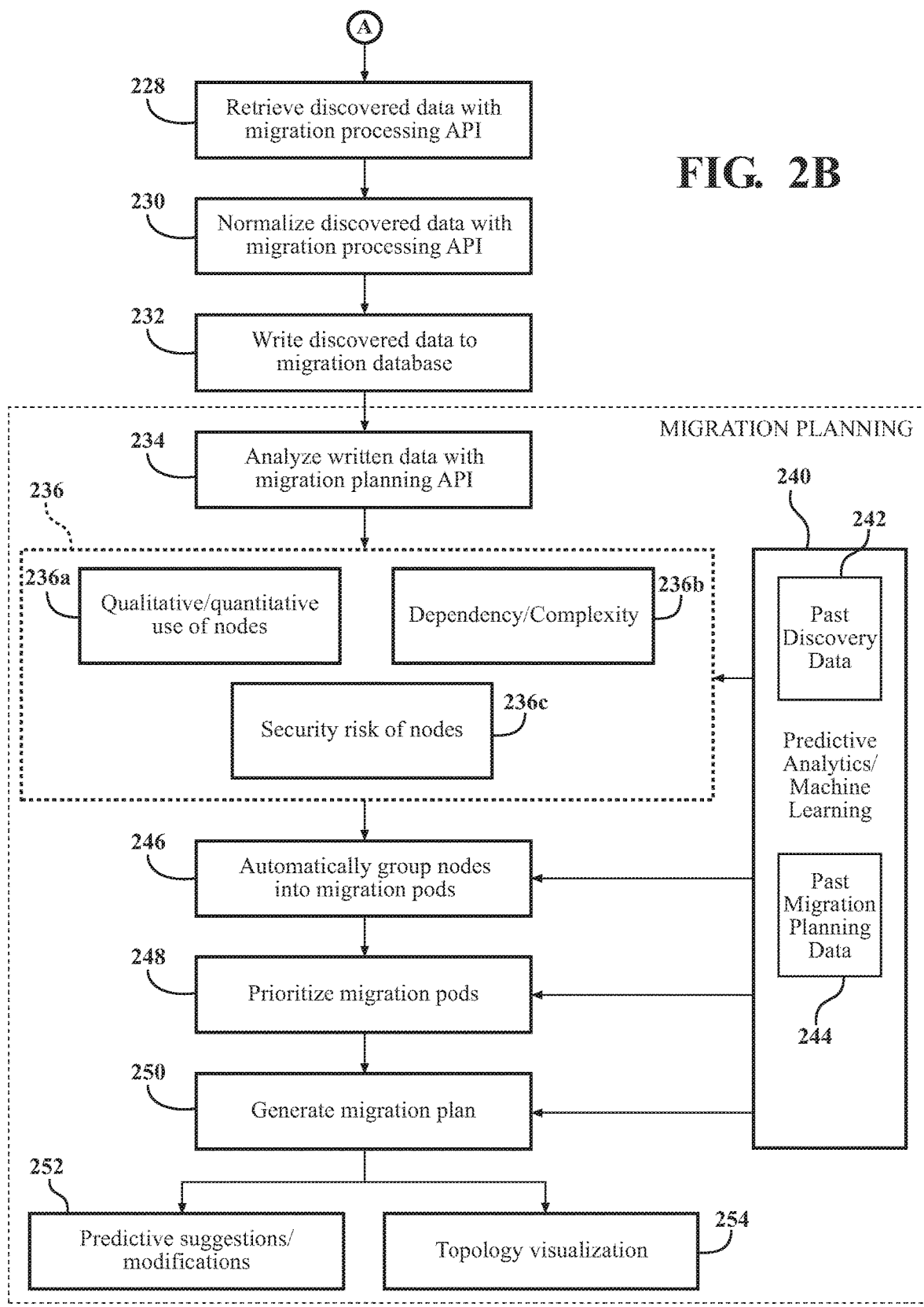
FIG. 2B is flowchart continued from FIG. 2A of various steps of the migration planning process according to the techniques described herein.

Several components of a system 20 for implementing the discovery and migration planning techniques are shown in FIG. 1, according to one example. As shown, such components comprise a collector node 30, a staging application programming interface (API) 32, a migration processing API 34, a migration database 36, and a migration planning API 38. These components, as well as other aspects of the system 20 are described in detail below. A computer-implemented method 200 for discovery and migration planning is performed by the components of the system 20 and is shown in FIGS. 2A and 2B, according to one example.

As shown in FIG. 1, the plurality of the computing nodes S1-S6 are shown at the source infrastructure 22. For simplicity, the computing nodes are identified herein by "Sn" when referenced in plural. While only six nodes S1-S6 are shown in this example for simplicity, any number of nodes Sn may be assembled at the source infrastructure 22 according to any configuration, and usually, highly complex configurations.

The computing nodes Sn at the source infrastructure 22 are remotely accessible through the internet 40, and more specifically, a network 42 utilized by the source location 24. The network 42 may be any suitable type, including, but not limited to wireless local area network (WLAN), local area network (LAN), personal area network (PAN), enterprise private network (EPN), virtual private network (VPN), system area network (SAN), storage area network (also SAN), wide area network (WAN), campus area network (CAN), and the like.

I. Discovery

The computing nodes Sn that are subject to discovery and migration planning are first identified by the enterprise and the IT service provider to be in-scope for the discovery and migration planning process. The enterprise and IT service provider may agree to which computing nodes Sn should be subject to the process beforehand. Alternatively, the enterprise may request that the IT service provider discover computing nodes Sn, on the fly, without any prior agreement or identification of computing nodes Sn that should be subject to the process.

At step 202 in FIG. 2, and as shown in FIG. 1, the technique for discovery comprises deploying the collector node 30 at the network 42 of the source location 24. The collector node 30 is a system, module, or application, which performs the discovery on the computing nodes Sn. The collector node 30 could be located on premise, in private cloud or public cloud. The techniques described herein may utilize one or multiple collector nodes 30 to perform the operations described herein.

A. Agentless Deployment

In one embodiment, the collector node 30 is deployed using an agentless process. More specifically, the collector node 30 may be deployed from a remote datacenter 46, which may be managed by the service provider or vendor for discovery and migration planning. In this example, any software installation for the collector node 30 occurs at the datacenter 46. The enterprise may provide the service provider with preliminary access to the environment of the source infrastructure 22 allowing a file to be downloaded to the network 42 for purposes of deployment of the collector node 30.

This technique avoids installing one or more agents at the network of the source location 24. For example, with an agent-monitoring approach, a separate application may need to be installed for each of the computing nodes Sn. By using agentless-monitoring, the collector node 30 avoids intrusion of and/or changes at the source network 42 and frees up important resources for the source network 42. In some instances, however, agent-monitoring techniques may be used to supplement agentless techniques.

In one instance, the collector node 30 is deployed in an agentless manner by using as a virtual appliance (OVA) at the network 42 of the source location 24. The virtual appliance may provide a virtual private network VPN to enable remote access from the datacenter 46, or staging API 32, to the collector node 30 at the source network 42. The collector node 30 deployment may be triggered by the staging API 32.

Examples of techniques for enabling agentless scanning comprise Windows® management instrumentation (WMI) monitoring and/or Windows® remote management (WINRM) for gathering data from Windows® based computing nodes Sn and secure shell (SSH) monitoring for gathering data from Linux® and Unix® computing nodes Sn, as well as from certain Mac OS X systems, and common information model (CIM), a vendor neutral approach. The collector node 30 may utilize an object-access based protocol, such as (SOAP) to enable the IT service provider to interpolate data from the computing nodes Sn.

In one example, deployment of the collector node 30 is implemented using a download link that is sent to the enterprise. The enterprise downloads a compressed image and imports a Virtual Machine Template into their virtual based infrastructure. From there, the enterprise gives the machine an IP Address and sets up the collector node 30 to start collecting dependencies and metadata. Once the Virtual Machine (OVA) is powered on and Network Accessible, data collection can commence. Of course, this requires privileged credentials be created for the discovery actions. This main be done with a service account with Domain Administrator.

As far as scanning is concerned, the collector node 30 has intelligence built in to check to see which protocol works and which doesn't when the node 30 runs. If something changes on the system, the change is captured such that collections are not missed. For example, the collector node 30 tries first over WinRM—if that fails then it tries CIM—if that fails—then it tries another communications interface (WMI)—these are all different sets of Cmdlets that use different code in PowerShell. If all fail, then the system is considered to have an issue and additional measures are taken to fix any issues.

With agentless monitoring, the collector node 30 may need to be provided with domain administration privileges in order to access the computing nodes Sn. To enable this, a credential validation process occurs by the collector node 30 at steps 204-210.

B. Validation

As shown in FIG. 1, a credential manager 50 is linked to the collector node 30. The credential manager 50 may be linked using a virtual appliance 52. Examples of virtual appliances include, but are not limited to VMware. Once the collector node 30 is deployed, and the credential manager 50 initialized, the credential manager 50 deploys a graphical user interface (GUI) on the collector node 30 by way of the virtual appliance 52. The GUI enables inputting of credentials into the collector node 30 to validate the computing nodes Sn, as identified at step 206. In a manual version, an end-user inputs the credentials through the GUI. Additionally or alternatively, certain credentials may be retrieved by the collector node 30 in an automated fashion. The credentials are stored in an encrypted format on the collector node 30. The credential manager 50 may be accessed at a frontend website 51 (and Windows Forms Application) accessible by the service provider for discovery and migration planning or an end-user. The process of credential matching using the collector node 30 optimizes the discovery process by eliminating manual login every time the collector node 30 needs to access a computing node Sn for discovering data 44.

Validation of the computing nodes Sn requires the collector node 30 to have access to the source network 42 to communicate with the computing nodes Sn. The collector node 30, having the inputted and securely encrypted credentials, determines whether the computing nodes Sn can be validated, at step 206. The collector node 30 tests, and matches the credentials to each computing node Sn being validated. During this validation process, the collector node 30 determines whether computing nodes Sn are available over the correct ports and if the correct access is available.

Correct Ports depends on which Protocol is being used. For example: WinRM uses 5985 and 5986; CIM uses 135 and a random high port 1024+; WMI uses 135 and a random high port 1024+; SSH uses 22. Default ports and can be changed by the customer at will. Administrative access to Sn is required due to the method of retrieval. Remote processes are run on the nodes using impersonation. In other words, a credential that is not the caller is use to start a process on Sn. This requires Administrative rights to Sn. It is different based on the OS as well. If the Sn is Linux, administrative rights are required due to the fact that process names cannot be enumerated when not owned by the user. For Windows, administrative access is needed to reach the administrative share on Sn. This allows data to be copied back after it is dumped to disk.

If the computing node Sn is successfully validated by the collector node 30, the validated computing nodes Sn are enrolled in data collection, at step 208 (described below). Enrollment is a process that initially happens automatically with validation. If a system is validated it is automatically enrolled in dependency mapping and discovery collection. Enrollment may be identified by a Boolean value in the database on a specific column related to the type of discovery the Sn is "enrolled" in. Enrollment can separately relate to dependency mapping (of dependency data), discovery collection (of metadata) and performance collection (of metadata). These discovery jobs happen at different intervals, thus an enrollment value may be needed to differentiate between what data is being collected from Sn.

Enrollment can be modified in a Web Interface of the collector node 30 and once a system is unenrolled, its job is removed from the collector node 30. Doing so enables control of what data is being collected from what Sn, not just every validated system. Through this process, the collector node 30 is enabled to discover the data for specified computing nodes Sn of the source infrastructure 22 that have been validated based on the credentials data.

On the other hand, and as shown at step 210, if one or more computing nodes Sn cannot be validated by the collector node 30, these computing nodes Sn are not enrolled in data collection, and the collector node 30 is prevented from discovering the data occurs for these non-validated computing nodes Sn.

The validation process described above may be performed once at the outset of the discovery process or may continuously be performed during the discovery process. For example, computing nodes Sn that are discovered or otherwise considered after initialization of the discovery process may require later validation.

Before or during discovery, the collector node 30 may scan the computing node Sn to ensure credentialed access from the collector node 30 is available. If so, discovery commences, and at step 208, the collector node 30 is configured to discover data 44 associated with the validated computing nodes Sn of the source infrastructure 22.

In one further embodiment, the credential and validation process may comprise registering the collector node 30 with the datacenter 46. Registration may comprise generating one or more encryption keys 31*a*, 31*b*, as shown in FIG. 1. The process may comprise generating only one key 31*b* after registration of the collector node 30, which is stored in a vault 53. The collector node 30 may access the vault 53 using the staging API 32 and a service bus 62 (described below). An encryption key 31*a* may also be stored locally at the source network 42 for efficiency purposes to reduce communications between the collector node 30 and the vault 53. In one example, the encryption keys 31*a*, 31*b* are identical. The encryption key(s) 31 may be generated using any suitable method or specification, such as advanced encryption standard (AES) 256 encryption, symmetric-key encryption, public or private key encryption, and the like.

The vault 32 is configured with non-transitory memory for saving and safeguarding cryptographic keys used by the service bus 62. The vault 53 may utilize validated hardware security modules with Federal Information Processing Standard (FIPS) level 2 or more security.

The credentials inputted at the frontend website 51 are encrypted using the same encryption key 31 that was saved in the vault 53 when the collector node 30 was registered. Accordingly, the credential data, which is sensitive, is encrypted and safeguarded from intrusions throughout the process flow between the collector node 30, vault 53, frontend website 51, and vice-versa.

C. Data Discovery

The data 44 discovered by the collector node 30 includes all relevant data to computing node Sn attributes and interconnections, application versions, fileshares, operating systems attributes, including but not limited to communication protocols and ports (TCP/UDP/IP), source and destination IP addresses and hostnames, sessions state information, listening and transmitting applications, database software and other relevant fields and attributes.

The staging API 32 can also command, or schedule the collector node 30 to collect data. Alternatively, the collector node 30 itself may be configured to with automated commands and schedules independent of the staging API 32.

Once deployed, discovery of data 44 with the collector node 30 may be an entirely automated process, requiring no manual control input. In some instances, however, manual input may be provided to instruct, tweak, or otherwise configure to the collector node 30 to adjust the discovery process or provide pointed manual discoveries.

1. Metadata

One type of data collected by the collector node 30 is metadata 44a about the computing nodes Sn, as shown in FIG. 1. The metadata 44a may comprise various information related to data associated with the computing nodes Sn, such as identification, operating parameters or configurations, signature patterns, performance data, communication data, and the like. Metadata 44a may include, for instance, hardware and operating system information utilized by the computing node Sn, applications that are running on the computing node Sn, system size, installed applications and versions, system specifications (e.g., memory, disk space, processor), and the like. Examples of metadata 44a other than those described herein are contemplated.

Metadata 44a may also be aggregated or interpolated over time by the collector node 30 or downstream API 32, 34, 48. For instance, the collector node 30 may collect performance information (such as disk space or memory utilization, and CPU usage) about the computing node Sn, to enable downstream components of the system 20 may make appropriate migration planning suggestions.

2. Dependency Data

Data collection about computing nodes Sn may be a dependency-based data collection. In other words, the collector node 30 not only discovers data 44 for a single computing node Sn, but also data for any other computing nodes Sn that depend on the given computing node Sn. Dependency, in one example, means that the one or more computing nodes Sn depend on one another for network communication at the source infrastructure 22. Dependency also refers to a communication profile of the computing node Sn, which is the interaction of one computing node to another, including all the applications and connection points.

Dependent computing nodes Sn may be connected through the network directly or indirectly. For instance, servers may be directly connected, whereas web clients are connected indirectly. Dependent computing nodes Sn may any type of dependency, such as co-dependency, multiple dependency, singular dependency, nested dependency, parent-child, master-slave dependency, etc. A computing node Sn may be at any part of a dependency chain. Defined collections of dependent computing nodes Sn are called migration pods and are described in detail below.

Accordingly, another type of data that the collector node 30 discovers about the computing nodes Sn is dependency data 44b, as shown in FIG. 1. In one embodiment, dependency data 44b comprises network statistics data. The network statistics can be obtained using a command-line network utility tool such as netstat. The collector node 30 performs calculations to obtain the dependency data 44b.

The collector node 30 may inquire into whether connection between any two or more computing nodes Sn is external (internet-based), whether the connection is egress or ingress, and the host name of the IP address of the communicating computing nodes Sn. Other examples of dependency data 44b include, but are not limited to, parallel processing in computer systems (parallelism), local IP address, foreign IP address and port numbers of connected computing nodes Sn, the identification of computing nodes Sn that are connected to the port of a computing node Sn, TCP connection states, active and inactive port connections on which the computing node Sn is listening, group membership information for computing nodes Sn, ethernet statistics, bytes of traffic, network interface statistics, memory statistics, connections according to protocol, IP routing table information, sessions opened between multiple systems over time, and the like. Examples of dependency data 44b other than those described herein are contemplated.

The collector node 30 may collect and organize dependency data 44b about managed devices on IP networks by using any open or vendor specific protocol executable at the application layer, such as Simple Network Management Protocol (SNMP), telnet, SSH, Web Services Management (WSMAN), WMI, WINRM, common information model (CIM), SOAP, and the like. Scanning by the collector node 30 may be privileged or non-privileged by the enterprise.

The collector node 30 may utilize one or more script modules through the virtual appliance 52 to enable collection of the data 44. For example, the collector node 30 may utilize one or more discovery modules 58, as shown in FIG. 1. The discovery module 58 may be PowerShell modules and may be configured to provide the collector node 30 with certain capabilities to discover the data 44. For instance, the discovery module 58 can provide access to legacy system logic for computing nodes Sn at the source infrastructure. The discovery module 58 may also provide the capability for the collector node 30 to define custom objects for transmission and normalization of the dependency data 44b.

In one example, all the discovery data 44 is metadata 44a. Differences between dependency data 44b and metadata 44a may be understood by different jobs (Sn Data Collection) running at different intervals. For example, dependency data 44b may run at an interval of every 5 minutes, but operating system data collection is every 6 hours. Dependency data 44b and Metadata 44a may both be JSON files—all data collected from Sn is serialized into JSON and processed by the Migration Processing API as such.

D. Network Statistics Adaptation Algorithm

Dependency data 44b collection may require customized and adaptable techniques because computing nodes Sn may operate on different operation systems. As such, the collector node 30 is equipped with a network statistics adaptation algorithm 300 for acquiring network statistics for any given computing node Sn. In other words, this algorithm 300 enables adjusting of the type of scanning performed by the collector node 30 based on the characteristics/type of computing node Sn that is discovered. The discovery module 58 may provide the collector node 30 with the capability to execute the adaptation algorithm 300 through the virtual appliance 52.

Figure 3:
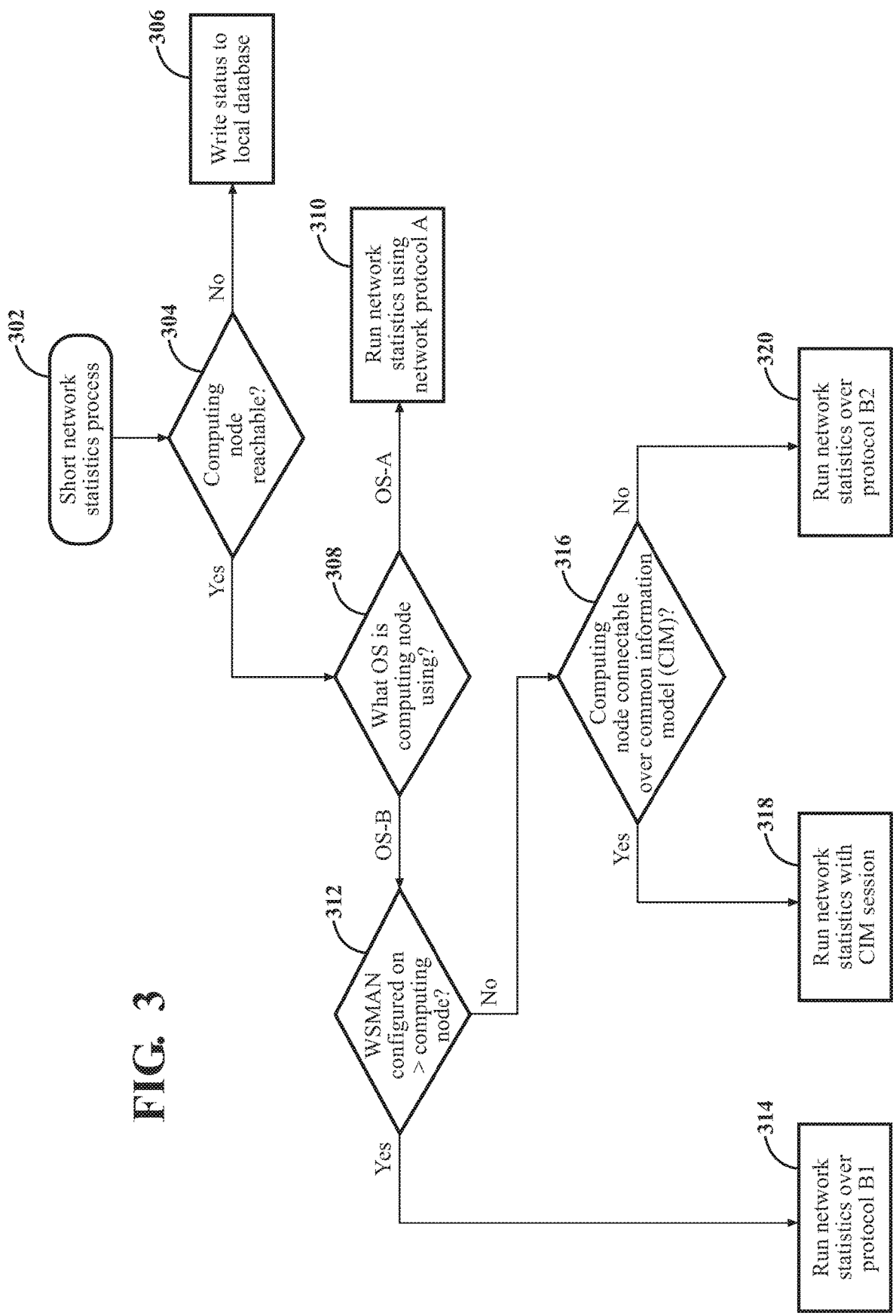
FIG. 3 is flowchart of a network statistics adaptation algorithm according to the techniques described herein.

Referring to FIG. 3, one example of the network statistics adaptation algorithm 300 is provided. At step 302, the collection of dependency data 44b using the network statistics processing commences. Step 302 may commence at the same time as the discovery step 208 in FIG. 2A.

At step 304, the collector node 30 determines whether the computing node Sn is reachable. In other words, the collector node 30 checks to see whether the computing node Sn is still available on the network 42. If not, the collector node 30 writes a status update to a local database, at step 306. The local database is local to source location 24 and may be local to the computing node Sn. The collector node 30 can later refer to the written status if the check at 304 is repeated at a later time for the computing node Sn.

If the collector node 30 determines that the computing node Sn is still available on the network 42, the collector node 30 at step 308 determines what operating system (OS) is used by the computing node Sn.

At step 310, the collector node 30 determines that the computing node Sn is using operating system "A", i.e., a first type of operating system. If so, the collector node 30 commences the network statistics process (or network protocol) customized for operating system A. This network protocol may be referred to as protocol A, corresponding to operating system A. Using protocol A, the collector node 30 can operate network services securely over an unsecured network to collect dependency data 44b. In one example, operating system A is further defined as Linux or Unix, and protocol A is further defined as SSH.

On the other hand, at step 312, the collector node 30 may determine that the computing node Sn is using operating system "B", i.e., a second type of operating system. If so, the collector node 30 determines whether WSMAN is configured for the computing node Sn. WSMAN is published by the International Organization for Standardization (ISO) as ISO/IEC 17963:2013 and is an open protocol standard for Simple Object Access that identifies core web service specifications and usage requirements for interoperability and management for servers, devices, applications and web services. WSMAN protocol uses HTTP communication to communicate with remote resources.

If the computing node Sn is using operating system B, and is configured for WSMAN, the collector node 30 commences, at step 314, the network statistics process using another protocol, i.e., protocol B1, corresponding to one type of protocol for operating system B. Using protocol B1, the collector node 30 can remotely run management scripts by remote connections facilitated by WSMAN to collect dependency data 44b. In one example, operating system B is further defined as Windows, and protocol B1 is further defined as WinRM. Other examples of operating systems and protocols besides those listed therein may be identified and utilized by the algorithm 300.

If the computing node Sn is using operating system B, but is not configured for WSMAN, the collector node 30, at step 316, determines whether the connection to the computing node SN can be established using CIM. CIM is an open standard programming model that uses object oriented techniques to describe the enterprise. CIM provides a common definition of management information for systems, networks, applications and services, and allows for vendor extensions. Using CIM, the collector node 30 can define device and application characteristics to control the computing node Sn and applications using a source/vendor other than the OS specific source/vendor. CIM may utilize Extensible Markup Language (XML).

If the collector node 30 determines that the connection to the computing node SN can be established using CIM, the collector node 30 commences, at step 318, the network statistics process over a CIM session. The CIM session is an object at the computing node Sn representing a connection to the remote server at the data center 46. The CIM session may comprise information about the connection, such as the name of the computing node Sn, the protocol used for the connection, session ID and instance ID. The CIM session may be created using a distributed COM session. Examples of other sessions besides those listed herein are contemplated.

On the other hand, if the collector node 30 determines that the connection to the computing node SN cannot be established using CIM, the collector node 30 commences, at step 320, the network statistics process using another protocol, i.e., protocol B2, corresponding to a second type of protocol for operating system B. Using protocol B2, the collector node 30 can write applications or scripts to automate operations on, and collect dependency data 44b from the computing node Sn. In one example, protocol B2 is further defined as WMI. Other examples of operating systems and protocols besides those listed therein may be identified and utilized by the algorithm 300.

The above-described steps of the algorithm 300 may be executed in a different order or sequence than that shown in FIG. 3. The algorithm 300 may be expanded to adapt to any number of operating systems and protocols.

E. Updates

The collector node 30 may identify one or more of the computing nodes Sn that have been modified after the discovery process has begun and initial data 44 reported. For example, discovery of the data 44 occurs by the collector node 30 conducting an initial scan of the computing nodes Sn (e.g., step 208), followed by periodically scanning for modifications after initial data discovery, as shown at step 212. The initial scan may be a bulk scan, and the follow-up scans may be more pointed, or specific scans for those systems that are predicted to change. The collector node 30 re-discovers data 44 associated with validated, but modified, computing nodes Sn at step 214, using the techniques described herein. By using this continuous-scanning approach, the techniques described herein address on-going modifications that may occur at the source infrastructure 22 after initial discovery. As a result, migration planning is more likely to reflect the most recent state of the source infrastructure 22 enabling such planning to be highly accurate and complete. The collector node 30 can continuously update the discovery of data 44 until the end of the discovery process or until a threshold satisfaction or accuracy level has been reached.

The collector node 30 may generate data 44 for validated computing nodes Sn according to any suitable refresh rate. For example, the collector node 30 may re-collect data 44 every 5 minutes, 1 hour, or 24 hours. The collector node 30 may scan any number of the computing nodes Sn sequentially or in parallel (simultaneously). Through these updates, discovery is extensible and evolving.

The IT service provider can be alerted by the collector node 30 if new computing nodes Sn are discovered from updates. Communications about the discovery process can occur through one of many means to various entities/people. For example, technical personnel of the IT service provider may access a command line prompt 61 to manipulate code for retrieving information about the discovery process. One example of such command line prompts includes PowerShell.

A portal 66 may provide the enterprise with a secure remote access service, supported by cloud computing, to enable the enterprise to connect to a website for viewing any of the aspects of the discovery discussed herein. For example, through the portal 66, an agent of the enterprise can query the collector node 30, staging API 32, and/or migration processing API 34 for the latest discovery data available, etc.

Additionally, discovery data 44 or alerts related thereto may be communicated to a configuration management database (CMDB) 68, as shown in FIG. 1. The CMDB 68 is a centralized repository that stores information about configuration items (CIs) of the IT service provider infrastructure. The CIs can be hardware, the installed software applications, business services, and human resources of the IT system. The CMDB 68 enables interrelations between the CIs to be maintained and supported. The CMDB 68 can provide project management tools to gather information about discovery for team members of the IT service provider for enabling the team members to remain informed of the discovery process. This way, if members of the IT service provider team are newly added, the CMDB 68 quickly enables the new members to understand how the discovery process is progressing and where the process currently stands. In one example, the CMDB 68 is linked with an IT service management (ITSM) platform to plan, design, deliver, operate, and control IT services offered.

F. Discovery Software Program

Figure 4:
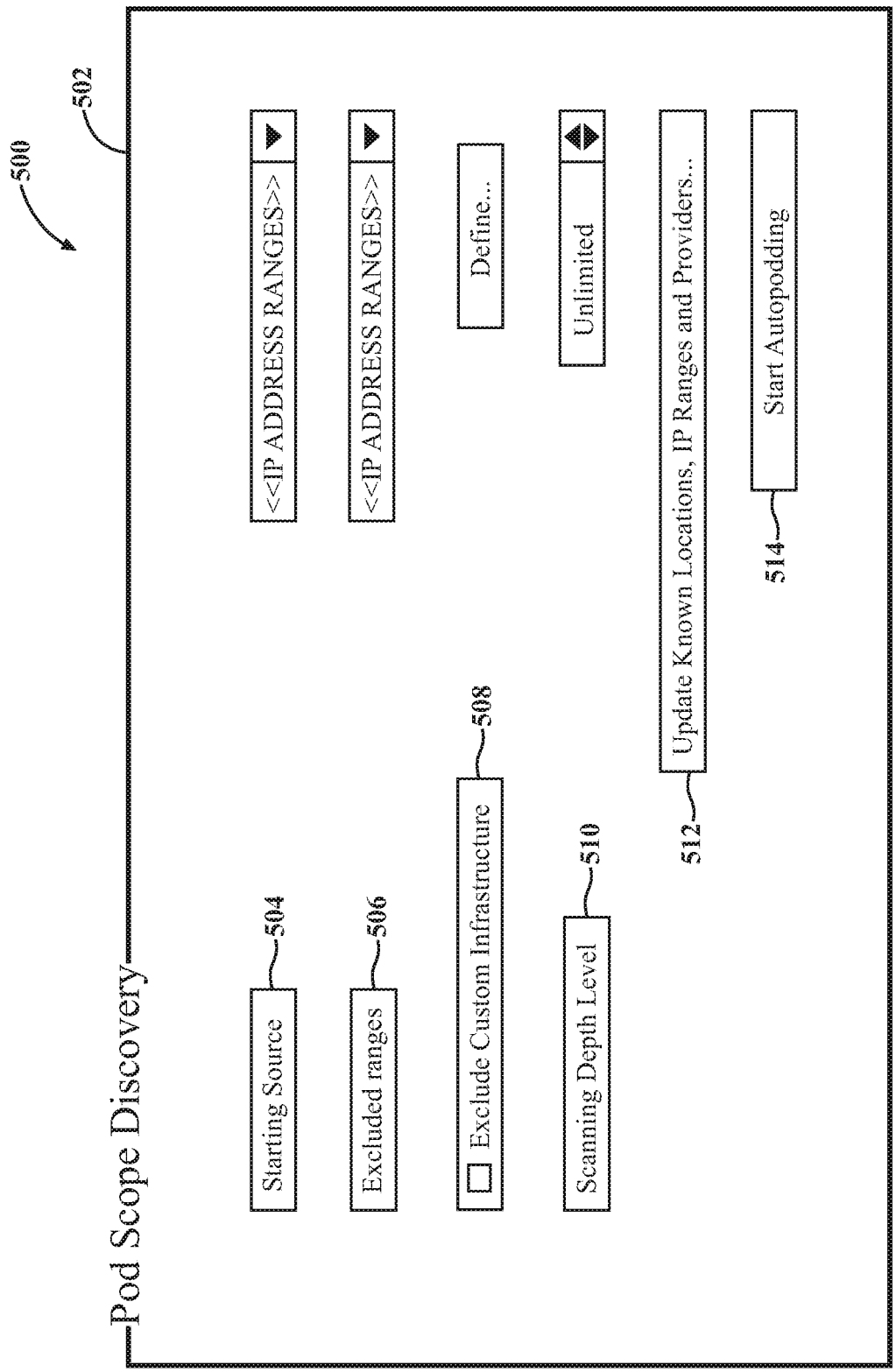
FIG. 4 is a sample screen of a software program for interfacing with and/or implementing certain aspects of the discovery techniques described herein.

Referring to FIG. 4, the discovery process may be managed using a software program 500 comprising instructions stored in one or more non-transitory computer readable media. The program 500 may be accessible from the frontend site 51 or from a reporting/analytics module 63, as shown in FIG. 1.

FIG. 4 illustrates a sample screenshot for of a "discovery" screen 502 of the program 500. In this example, parameters for the discovery process may be specified. The parameters, when selected, cause the collector node 30 to behave in accordance with the selected parameters. This enables manual configurations for tweaking the collector node 30.

One parameter that may be set in the program 500 is a "starting source" parameter as shown at 504. The starting source parameter 504 designates one or more starting IP addresses at the source network 42 or source infrastructure 22 for initiating, or re-starting the discovery process. The IP address, for example, may be one or more addresses for computing nodes Sn at the source network 42. The starting source parameter 504 may be useful where targeted or pinpointed discovery is desired for select and/or known computing nodes Sn. For instance, it may be desired to scan only a certain group of computing nodes Sn without scanning all other nodes Sn.

Another parameter is the "excluded ranges" parameter 506, which designates one or more IP addresses at the source network 42 or source infrastructure 22 for which to exclude discovery. The IP address, for example, may be one or more addresses for computing nodes Sn at the source network 42. The excluded ranges parameter 506 may be useful where targeted or pinpointed exclusion is desired for select and/or known computing nodes Sn. For instance, it may be desired to exclude only a certain group of computing nodes Sn because the group has already been scanned. Optionally, at 508, a custom infrastructure can be excluded from the discovery process instead of select nodes Sn. The custom infrastructure may be a pod Pn or a group of pods Pn that are known. The custom infrastructure can be defined in the program 500 using any suitable definition, such as a custom infrastructure ID comprised of a group of IP addresses for the nodes Sn.

At 510, the program 500 enables selection of a scanning depth level. The scanning depth level is configured to enable selection of how deeply the collector node 30 should conduct the discovery process. In one example, the scanning depth level 510 specifies how many degrees of separation to search from any given node Sn. For example, the depth may be specified to find "n" number of dependencies in a chain before stopping. Scanning depth level 510 may also specify whether to search for singly or multiply dependent nodes Sn, bilateral or unilateral dependencies, and the like. Scanning depth level 510 may also take into account computing resources available to the collector node 30. In one example, as shown in FIG. 4, the scanning depth level 510 can be set to "unlimited", thereby specifying no limitations on the collector node 30 to enable the collector node 30 to discover everything of relevance at the source network 42.

At 512, the program 500 enables the user to selectively update scanning for the source infrastructure 22 as a whole, or known locations, nodes Sn, IP ranges, and/or providers thereof. Such updates can be executed like those described above and shown at steps 212, 214 of FIG. 2A.

At 514, the program 500 enables selection of an "auto-podding" feature. The auto-podding feature 514 may become available once sufficient data 44 has been collected. The auto-podding feature 514 involves the grouping of nodes Sn into migration pods Pn. Such grouping implicates the migration planning API 38 and is further shown in FIG. 5 and described below (e.g., at step 246).

Figure 5:
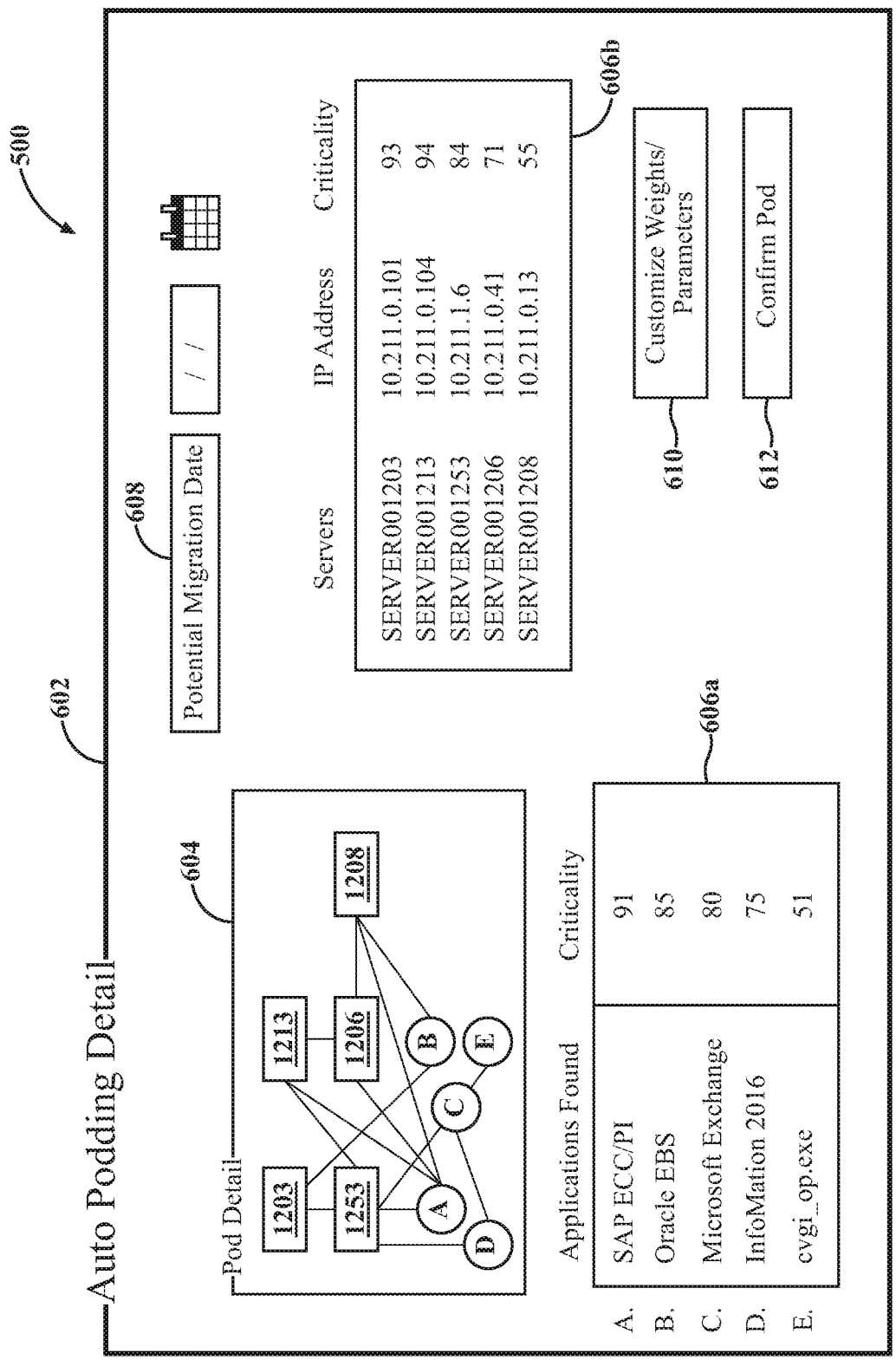
FIG. 5 is a sample screen of the software program for interfacing with and/or implementing certain aspects of the auto-grouping techniques described herein.

The discovery screen 502 may have any configuration other than that shown in FIG. 5. Moreover, the any of the APIs described herein may automate any manual process described in relation to discovery, or the features of FIG. 4.

G. Data Transmission

Once the collector node 30 collects the discovered data 44, as described above, the collector node 30 transmits discovered data 44 from the network 42 of the source location 24 to the staging API 32 at the remote server or datacenter 46. This step is shown at 216 in FIG. 2A.

The collector node 30 may provide, generate, or otherwise transform the raw dependency data 44b in a custom object-oriented format for transmission. One example of the object-oriented format is JavaScript object notation (JSON). Other examples include Extensible Markup Language (XML), and supersets or hybrid versions of JSON. The collector node 30 may serialize the dependency data 44b to the object-oriented format and write the dependency data 44b to a non-transitory computer-readable medium or memory that is accessible by the collector node 30, e.g., at the source network 42. This process may involve the collector node 30 generating and saving one or more files including the serialized and object-oriented dependency data 44b. The file may also comprise the ID of the enterprise, or any computing nodes Sn of the enterprise.

This formatting provides advantages for downstream processing of the data 44b by the APIs 32, 34, 38. For example, the object-oriented format described above provides a common language of communication for the web-service based APIs regardless of whether these applications are developed using different coding languages or by different vendors.

The object file works in conjunction with the APIs 32, 34, 38. As the data moves from the Sn to the collector node 30, it is in what is called a PowerShell Object. This object is in then converted to a JSON format—which can be interpreted by other programs other than PowerShell. This is the primary reason for serializing to JSON. The Staging API and the Migration API are configured to both understand JSON. These JSON files are also limited to 250 objects per file. This limits the size of the files to improve uploads time.

The collector node 30 may prepare and transmit the metadata 44a in a similar manner as described. Alternatively, as shown in FIG. 1, the metadata 44a may be transmitted separate from the dependency data 44b. The data 44a, 44b may be transmitted simultaneously or at different times. Furthermore, data 44 transmission may be bulk and periodic thereafter.

Once the dependency data 44b is formatted and saved to the file, the collector node may immediately upload the file from the source network 42 to the staging API through the internet 40. After transmission, the collector node 30 may delete the corresponding file for the dependency data 44b from memory so that the file is eliminated at the network 42. Such deletion may occur immediately or after a specified period of time determined by the collector node 30. The file is deleted after it is processed to save disk storage because the data is in the database 36 at that point so it is not needed after it is processed in the form of a file.

At step 218, the staging API 32 receives the discovered data 44 transmitted by the collector node 30. The staging API 32, more specifically, may receive the file and metadata from the collector node 30. The staging API 32 may receive the data 44 in bulk and/or aggregate transmissions.

In one embodiment, the staging API 32 is a centralized web services API. The staging API can be internet based and configured to expose the functionality of the collector node 30 to the migration processing API 34. The staging API 32 enables an intermediate (proxy) buffer or queue between the collector node 30 and the downstream APIs, such as the migration processing API 34. In other words, the staging API 32 permits holding of the data 44 so that the data 44 can then be read, at-will, by the next processing phase, i.e., by the migration processing API 34. The API 32 may be configured with a non-transitory memory or database at the datacenter 46 to enable the buffer. Alternatively, as described below, the API 32 may interact with a shared folder to permit queueing of the data 44. In addition to the data 44, the staging API 32 can also buffer requests for data from the migration processing API 34, as will be described below. The staging API 32 helps compensate for differences in rate of flow of discovered data 44, or time of occurrence of events, when transferring data 44 from the collector node 30 to the migration processing API 34.

For security, the data 44 may be uploaded to the staging API 32 using Secure Sockets Layer (SSL) and secure Hypertext Transfer Protocol (HTTPS) to secure the internet 40 connection between the collector node 30 and staging API 32 and to safeguard the data 44 that is being sent therebetween. In one further example, TCP PORT 443 is utilized for VPN access. In turn, this prevents intrusions from reading and modifying any data 44 transferred. For further security, the data 44 may be transmitted through a firewall 56 as shown in FIG. 1. The firewall 56, according to one embodiment, is a web application firewall (WAF). The firewall 56 may white-list the public ID of the enterprise to only permit transmissions from the source network 42.

When uploaded to the staging API 32, the data 44 is prepared for retrieval by the migration processing API 34. In one embodiment, the migration processing API 34 is a centralized web services API. The migration processing API 34 retrieves data 44 from the staging API 32, and processes (e.g., updates, transforms, normalizes, checks,) the data 44 for downstream purposes.

The data 44 buffered at the staging API 32 may not be suitable for data presentation to the end-user and may include data 44 in an unprocessed or incomplete form. Accordingly, in one embodiment, the staging API 32 is privately accessible solely by the migration processing API 34 to avoid exposure of an unprocessed version of the data 44. Alternatively, the staging API 32 may be publicly accessible by the migration processing API 34, or other features of the system 20.

H. Access Control

To enable further security, the staging API 32, in one embodiment, may apply an access control measure to the discovered data 44, as shown at step 220 in FIG. 2A. In other words, in such instances, the migration processing API 34 is required to satisfy the access control measure in order to retrieve the data 44 from the staging API 32. The staging API 32 applies appropriate security controls to restrict access to the data 44. This security measure is based on a few factors. The Network Firewall is filtered based on what Public IP Address can upload files to the URI. The Staging API 32 also implements a security measure to only allow JSON documents to be uploaded.

At step 222, the migration processing API 34 attempts to satisfy the access control measure implemented by the staging API 32. Once the files are uploaded to the Staging API 32 and are ready to be processed, the Migration Processing API 34 picks up the JSON file and implements another Type Safe Security measure. Only JSON Objects that match the resulting Object Type will be accepted, i.e., Objects must have a CustomerId, ComputerName and FullyQualifiedDomainName.

At 224, the staging API 32 determines whether the access control measure is satisfied by the migration processing API 34. The Firewall satisfies this requirement. The Staging API 32 is behind the Firewall so the Staging API 32 may not implement the measure itself. However, the Staging API does only allow JSON documents to be uploaded.

If the attempt is unsuccessful, i.e., the access control measure is not satisfied, then the staging API 32, at step 226, denies retrieval of the discovered data 44 by the migration processing API 34. If the attempt is successful, i.e., the access control measure is satisfied, then at step 228 on FIG. 2B, the staging API 32 permits retrieval of the discovered data 44 by the migration processing API 34. The retrieval process is described in detail below.

In some embodiments, the staging API 32 may not utilize any access control measures. For example, access to the staging API 32 may be pre-authorized or not needed in view of the security, or privacy of the communications with the migration API 34.

II. Processing Discovered Data

At step 228, and once the migration processing API 34 satisfies the access control measure, if applicable, the data 44 can be retrieved from the staging API 32. In one embodiment, retrieval is utilized using a shared folder 60 and a processing service bus 62, as shown in FIG. 1 The shared folder 60 and service bus 62 are shared between the staging API 32 and the migration processing API 34. The shared folder 60 may be any non-transitory storage medium and may be a sub-component of the service bus 62. The service bus 62 subscribes to a message (queue) bus of the staging API 32 and executes the commands against the migration processing API 34. The migration processing API 34 may be executed by an operating system that enables execution of the service bus 62. The service bus 62 may be OS specific and may include a set of installable components for providing messaging capabilities using message-driven applications. The shared folder 60 provides storage and retrieval of queued staging API 32 messages. The service bus 62 and shared folder 60 may enable multiple and concurrent retrieval of the published message stream.

When the staging API 32 receives the dependency data 44*b* (e.g., object file) and metadata 44, the staging API 32 sends the dependency data 44*b* to the shared folder 60 and sends the metadata 44*a* to the service bus 62. The staging API 32 also publishes/sends a message to the service bus 62 with the correct properties for the migration API 34 to process the data 44. When a message is received, the service bus 62 de-serializes the message and looks for the enterprise to which the data 44 is attached and a Uniform Resource Identifier (URI) to which the migration processing API 34 should send the data 44. The URI is a compact sequence of characters that identifies an abstract or physical resource.

The migration processing API 34 utilizes the OS service to consume the message published to the service bus 62 and read the dependency data 44*b* from the shared folder 60. The data 44 is then read into memory and sent to the migration processing API 34. The service bus 62 then deletes the data 44 from the staging API 32, or datacenter. The process of retrieving the data 44 by the migration processing API 34 may be executed according to other examples not specifically recited herein. A Service Bus is a programming architecture technique application that can be used when a layer of an application stack is "decoupled" from one another. The Staging API 32 and Migration Processing API 34 are decoupled and cannot communicate directly with one another. The Service Bus provides the communication link for the Migration Processing API 34 Service to process the files uploaded to the Staging API 32.

At step 230, the migration processing API 34 processes the data 44 after retrieving the same from the staging API 32. At step 232, the migration processing API 34 writes the discovered data 44 to the migration database 36.

The migration processing API 34 is configured to processes the data 44 for downstream purposes, such as migration planning. Such processing may be performed at the migration processing API 34, or during or after the data 44 is written to the migration database 36.

In one example, the migration processing API 34 normalizes the discovery data 44. The discovered data 44 may be captured from the plurality of different source formats. Normalization may include the migration processing API 34 normalizing the discovered data 44 by applying a set of rules to the discovered data 44 to transform the data 44 into a single, common format. Normalization may also comprise the migration processing API reducing data redundancy, intelligently deleting or creating associations for the data, creating relationships, and the like. In another example, the migration processing API 34 reads the object files for the dependency data 44*b* and either inserts or updates the results to the migration database 36. The migration processing API 34 can normalize the discovered data 44 across any third party application dependency mapping and discovery tool. One example technique for normalization comprises extract, transforming and loading (ETL).

Normalization maintains the integrity of the discovered data 44, thereby contributing to the security and fortification of the data 44. Normalization may comprise examples other than those described herein. Once the file is uploaded to the Staging API 32, and is picked up, the service reads the JSON and determines at what URI to process the data. This URI method expects an array of JSON objects and de-serializes the file and checks to make sure it is in the correct format for processing at the URI expected.

In some instances, the collector node 30 may provide preliminary normalization or transformation of the discovered data 44. For example, the collector node 30 may utilize a transformation tool 64, accessible through the virtual appliance 52. The transformation tool 64 may be a script module, such as a PowerShell module. The transformation tool 64 may be utilized during the discovery process. The transformation tool 64 may normalize data associated with computing node Sn names and fully qualified domain names (FQDN). The transformation tool 64 may provide any of the normalization capabilities described above for the migration processing API 34. Furthermore, the migration processing API 34 may utilize this transformation tool 64 to perform normalization. This tool 64 provides a method of taking the data for Sn for it to make sense to the Migration Processing API 34. Each uploaded document has the following properties, CustomerId, ComputerName, and FullyQualifiedDomainName. These three values ensure the Sn object in the database is the same as the Sn at the Customer Site.

The migration processing API 34 may process the data 44 by error checking the data 44. For instance, the migration processing API 34 may utilize an error-checking algorithm to verify the data 44 received by the migration processing API 34 has not been damaged, corrupted, or otherwise subject to unwanted errors. The error-checking algorithm may comprise one or more of a cyclic redundancy check (CRC), hash function, checksums, or the like. The migration processing API 34 may also be configured to correct any errors in the data 44 using techniques such as Automatic Repeat reQuest (ARQ), or any type of error correcting code.

In some embodiments, the migration processing API 34 is configured to process the data 44 using Type Safe Classes to protect against unwanted code injection or hacking (e.g., SQL injections). Data is checked to ensure that it will be accepted by the database. If an extra property is in a file that is not in the Class that the Migration Processing API 34 expects, it will be dropped and an error will occur. Migration processing API 34 executes stored procedures or subroutines to access a database management system at the migration database 36. The stored procedures may provide validation, access control, and transaction management mechanisms for the data 44 to be stored in the migration database 36. In one embodiment, the migration API 34 utilizes SQL Stored Procedures for the rapid processing and storage of the data 44. Other database systems and implementation languages for the stored procedures may be utilized however.

The migration database 36 may be any non-transitory computer readable medium configured to receive and store the discovered data 44. The migration database 36 may be managed by the discovery and migration planning service provider, by the enterprise, or by a third party. The migration database 36 may be multi-tenant, or a dedicated database specifically for the discovered data 44 and/or project information for the discovery and migration planning processes. As described above, any of the processing and analyzing done by the migration processing API 34 may be performed while the data 44 is stored in the migration database 36.

The discovery process described above may be performed individually and independently of migration planning. Migration planning is dependent on the discovery process, but in some embodiments, can be performed separately. Independent, and collaborative uses of these processes are fully contemplated. The migration planning process is described in detail below.

III. Migration Planning

Having described the discovery process, the system 20 is further configured to intelligently plan for migration of any number of the computing nodes Sn discovered at the source infrastructure 22 for moving the same to the target infrastructure 26. The migration planning process includes methods and systems for planning, scoping, categorizing, organizing, and prioritizing stand-alone applications and underlying computing nodes Sn.

With reference to FIG. 2B, and at step 234, the migration planning API 38 analyzes the discovered data 44 that is written to the migration database 36. The migration planning API 38 may extract data 44 from the database 36 and translate the data 44 into a format suitable for the migration planning process.

The migration planning API 38 is a centralized web services API and enables queries for the discovered data 44 from applications relevant to the planning process. Examples of such applications that interact with and query the migration planning API 38 are explained below.

A. Criticality Evaluation

To analyze the data 44, the migration planning API 38 is configured to apply a criticality algorithm to the discovered data 44, as shown at 236 in FIG. 2B. The criticality algorithm determines a criticality parameter associated with each of the discovered computing nodes Sn. The criticality parameter identifies an actual and/or potential impact that each discovered computing node Sn has to migration. The criticality parameter may be determined only to those computing nodes Sn that are slated for migration. Additionally, the criticality parameter may be determined for computing nodes Sn having an impact on migration, but not slated for migration. Furthermore, the criticality parameter may be single variable parameter or may be multiple variable parameter based on assessment of a variety of factors, such as those described below. The term "parameter" is not limited to a single numerical or categorical variable.

In one example, as shown at 236a, the migration planning API 38 employs the criticality algorithm to analyze the data 44 to synthesize a quantitative and/or qualitative factor for discovered computing node Sn. The criticality parameter can be derived, in part or in whole, from qualitative and quantities analysis. As used herein, quantitative use is a numerical variable and refers to the how frequently the computing node Sn is/was utilized in the network. Qualitative use is a categorical variable and refers to a quality/impact/importance of the computing node Sn the network. For instance, the criticality algorithm may analyze a frequency of application connection points to identify and prioritize the criticality of the interconnections and determine how many other computing nodes Sn rely upon these connection points. The criticality algorithm can apply a weighting factor to the application for assessing criticality. Qualitative and quantities analysis may be performed for any of the characteristics, properties, operations, or capabilities of the computing nodes Sn, as described herein, such as computing node Sn performance, capacity, latency, and the like.

In another example, as shown at 236b, the migration planning API 38 employs the criticality algorithm to analyze the data 44 to determine dependency and/or complexity of computing nodes Sn that are dependent on one another. Each migration pod defines a group of discovered computing nodes Sn that depend on one another for network communication at the source infrastructure 22. Examples and derivation of migration pods are described below. Some of these migration pods are more complex than others. Greater complexity may indicate that one or more computing nodes Sn in the migration pod possess greater criticality to migration. As such, the criticality algorithm can assess the complexity of the migration pods as a factor in determining the criticality parameter. A weighting factor can be assigned to the migration pod generally, or any computing node Sn within a migration pod. Furthermore, weighting factors may be broken down into sub-factors of dependency, such connection weight by source, destination, and protocol/process.

At 236c, the migration planning API 38 employs the criticality algorithm to analyze the data 44 to determine to identify security risks associated with one or more of the discovered computing nodes Sn. The criticality parameter can be derived, in part or in whole, from security risk analysis. Security risks may include actual or potential security issues. The migration planning API 38 can determine which computing nodes Sn are publicly available based on assessing inbound internet traffic. Such publicly available nodes may have a higher security risk. Such risks may also be caused by misconfigurations at the computing node Sn. The criticality algorithm may detect outbound scanning for detecting processes that may have been exploited and actively pivoting. The migration planning API 38 can model and query heuristics to identify security risks associated with one or more of the discovered computing nodes Sn. In one example, nodes and traffic are analyzed based on current security risks. For example, port 23 is telnet traffic which can send credentials over clear text. This connection can be deemed a security risk and flagged for review with the enterprise. Security risks that the migration planning API 38 can identify from the discovery data 44 include malicious uses, abuses and nefarious use of cloud computing, shared technology (multitenancy), operational failures, anti-virus program activity, unexpected communications to/from public internet such as to critical internal databases, outdated software requiring patching, hijacking attempts, data loss or leakage, network traffic modifications, secondary use of data, logging incidents, insecure or incomplete data deletion, or the like. A weighting factor can be assigned to any computing node Sn based on the security risk analysis. Security risks other than those described herein may be utilized.

Analysis by the migration planning API 38 comprises further intelligence around data discovered that may threaten a migrations success. One example of sensitive data includes hard disk monitoring thresholds. If a node Sn is being migrated, the migration planning API 38 determines if the hard disks are within the thresholds being monitoring. If they are not, the hard disks will cause organizational issues. Hard disk monitoring thresholds further provides opportunities for consolidation that may directly affect contractual obligations by the IT service provider. For example, the IT service provider may be contractually obligated to help the enterprise reduce their storage footprint by a certain amount. The migration planning API 38 helps meet these contractual obligations by identifying consolidations and how much storage can be removed without breaking monitoring thresholds.

In other examples, the migration planning API 38 identifies hard-coded IP addresses because such application configurations can cause the migration to fail. Furthermore, the migration planning API 38 detects certain virtual machine configurations that will not be compatible with certain migration technology. These configurations are remediated prior to migration. The migration planning API 38 can flag that certain network adapter configurations may need to be updated when a server is moved upon migration. The migration planning API 38 can flag dependencies that are not within the destination datacenter (Firewall Rules). Certain firewall rules to other services that have not moved yet, or will not move (client networks), are identified by the migration planning API 38 and need to be opened. For public facing dependencies, where a computing node Sn is an internet facing system, the migration planning API 38 identifies such, and updates/configures network address translations (NATs) and public domain name systems (DNSs). To further minimize migration failure, the migration planning API 38 can identify DNS changes and turn down time-to-live (TTL) hop limits to lowest values prior to the migration. The migration planning API 38 further can identify Windows® server dependencies, such as IIS Bindings and SQL Server Hardcoded IP Addresses and take appropriate action.

In one example, the migration planning API 38 analyzes the data 44 for quality checking purposes. As described above, the collector node 30 may identify one or more of the computing nodes Sn that have been modified after the discovery process has begun and initial data 44 reported. The migration planning API 38 may independently or collaboratively (with the collector node 30) make such determinations and check communication profiles for computing nodes Sn for modifications. The migration planning API 38 may check whether the computing node Sn is in backups, monitoring, and/or connecting with a similar amount of system in its communication profile before and post migration.

As will be described below, the criticality parameters guide the several aspects of the migration planning process. Factors or variables other than those described herein may be extracted from the data 44 and analyzed by the migration processing API 34 to determine the criticality parameters.

The above-described factors 236a, 236b, 236c are analyzed based on data 44 discovered from the computing nodes Sn themselves, which are subject to the process. The techniques described herein, however, may utilize machine learning and artificial intelligence to execute predictive analytics based also on past data to determine criticality parameters.

As shown in FIG. 2B, the migration processing API 34 may expand on the criticality analysis by employing a predictive analytics module, represented at 240. Predictive analytics may utilize past discovery data 242 and/or past migration planning data 244. The past discovery data 242 is discovery data that was discovered from past discovery processes. The past migration planning data 244 is data that was used or otherwise generated for past migration planning. The past discovery and migration data 242, 244 may be from retrieved from prior services for the same enterprise or a different enterprise. The past data 242, 244 may filtered to include data from past computing nodes Sn that are similar to the computing nodes Sn subject to discovery and/or data from past migration plans that are similar to the current planned migration. The past data 242, 244 may be stored in any non-transitory medium accessible by the migration processing API. In one example, the past data 242, 244 is stored in the migration database 36. The predictive analytics module 240 may interact directly or indirectly with the database 36.

The migration processing API 34 may analyze the discovered data 44 in conjunction with the past data 242, 244 to create statistics and predictive modeling. In so doing, the migration processing API 34 can make the criticality algorithm more intelligent. The criticality parameters can be based on actual and predicted values for the factors, e.g., 236a, 236b, 236c. Using predictive analytics, criticality is constantly evolved based on an aggregation of past experiences.

In one example, the migration planning API 38 employs the criticality algorithm in conjunction with predictive analytics to predict for any computing node any one or more of: qualitative and quantitative factors, potential security risks, predicted or suggested dependency characterizations, predictive inclusion of one or more discovered computing nodes into one of the migration pods, or exclusion of one or more discovered computing nodes from one of the migration pods, predictions about a latency impact that one or more discovered computing nodes will have on planned migration (e.g., latency if the nodes are separated), likelihood of migration failure for one or more discovered computing node, or any other predictions regarding potential impact or criticality to migration other than those described herein. Predictive analytics may be utilized to determine criticality parameters using any data or technique besides those described herein.

Examples of analytical techniques that can be utilized by the migration planning API 38 to enable predictive techniques described herein include but are not limited to any one or combination of the following: regression analysis (linear, logistic, time-series, duration, discrete choice), clustering, ensemble modeling, and machine learning techniques such as Naïve Bayes, neural network analysis, support vector machines (SVM), binary classification models, multiclass classification models, supervised/unsupervised/semi-supervised learning, regularization, instanced based algorithms (k-Nearest Neighbor (kNN), Learning Vector Quantization (LVQ), Self-Organizing Map (SOM), Locally Weighted Learning (LWL), and the like. For any predictive grouping, the migration planning API 38 can utilize fingerprinting to map the data 44 into discrete bit strings to uniquely identify certain strings of data 44. Fingerprinting may also be applied to uniquely identify nodes Sn or pods Pn. Examples of generating fingerprints include but are not limited to, cryptographic hash functions, Rabin fingerprinting schemes, or the like.

Moreover, the predictive algorithms may be embodied in non-transitory computer readable media having instructions, which when executed by one or more processors, perform the tasks described herein. The predictive analytics and machine learning algorithms may be designed by any open source or commercially available predictive analytical tool.

B. Auto-Grouping

At step 246, the migration planning API 38 automatically groups the discovered computing nodes Sn of the source infrastructure 22 into migration pods based analysis of the discovered data. Grouping can be based on current or predictive analysis of the data 44.

The computing nodes Sn are grouped into the migration pods. In one example, as shown FIG. 1, six computing nodes (S1-S6) are provided at the source infrastructure 22. Based on analysis of data 44 discovered respectively from these nodes S3-S6, and possibly other nodes, the migration planning API 38 identifies computing nodes S3-S6 as a group that depend on one another for network communication at the source infrastructure 22. Hence, as shown in FIG. 1, nodes S3-S6 are grouped into migration pod P1. Migration pod P1 is moved to the target infrastructure 26 after migration. While this example has been provided for simplicity, the planning process may include any number of migration pods Pn (e.g., potentially hundreds or thousands), having varying levels of complexity or interdependency (e.g., potentially hundreds of nodes for any given pod).

Grouping the computing nodes Sn into migration pods Pn involves may involve fixing the relation movement of the computing nodes Sn. More specifically, the migration planning API 38 can link the computing nodes Sn of each migration pod Pn to require collective migration of the computing nodes Sn of each migration pod and to prohibit individual migration of any computing node Sn of each migration pod Pn. Thus, based on the sensitivity of interdependencies, and the risks associated with disconnection, each migration pod Pn should be moved at the same time.

The migration planning API 38 may group the computing nodes Sn anytime during or after the discovery or planning processes. In other words, not all the data 44 at the source infrastructure 22 needs to be discovered. The migration planning API 38 may have sufficient data 44 to define a migration pod Pn, without requiring further data 44 discovery. Furthermore, grouping may occur anytime during or after the migration planning API 38 analysis the data 44. For instance, pods Pn may be generated progressively as data 44 is progressively analyzed. Alternatively or additionally, pods Pn may be generated at once, after all relevant data 44 has been analyzed.

Grouping occurs based on the analysis of the discovered data 44 from step 236. In other words, the migration planning API 38 groups the computing nodes Sn based on the criticality parameters generated for the computing node Sn using any of the actual or predictive data.

Grouping can be an entirely automated process requiring no user intervention. In other examples, some manual input can be provided to tweak or override the automated grouping determined by the migration planning API 38, or to otherwise customize certain groups based on factors unknown to the system 20.

Migration of the computing nodes Sn is a highly complicated task that takes hundreds of manual hours to complete for a single pod Pn. The benefits of machine learning is to cut those man-hours down by identifying information discovered on the computing nodes Sn and applying algorithms to identify hidden patterns in the data.

Accordingly, the migration planning API 38 can also use machine learning and/or predictive analytics to generate predictions or suggestions to group the computing nodes Sn, at step 246. Predictive grouping may be based on the past discovery and migration planning data 242, 244 as well as any predicted factors identified at step 246. Predictive grouping may further take into account groupings determined from past migration planning to optimize a current grouping.

In this way, the migration planning API 38 does not simply group computing nodes Sn based on dependency, but rather groups the nodes Sn based on actual and predicted criticality and to minimize risk to the migration process.

Predictive suggestion may include suggestions to move certain computing nodes Sn into certain migration pods Pn. Similarly, predictive suggestion may include suggestions to exclude certain computing nodes Sn from certain migration pods Pn. For instance, analysis of the past data 242, 244 may reveal a historical trend or correlation that the identified computing node Sn is often grouped into the wrong, not optimal, or undesired pod Pn, and therefore, should be given careful consideration.

In another example, the migration planning API 38 can use predictive analytics to automatically group one or more of the discovered computing nodes Sn based on predicted or actual security risks. For example, certain computing nodes Sn may have security risks associated therewith may be excluded from or added into migration pods Pn to minimize risk to other discovered computing nodes Sn having no security risks associated therewith. In this way, the migration planning API 38 minimizes risk to the migration process by predicting otherwise unforeseeable risks.

In one example, a K-Means clustering algorithm is applied to the data 44 to identify which computing nodes Sn are communicating to one another in groups. In order to do this filters are applied to infrastructure services, link local IP addresses, and self-traffic. For infrastructure services, the filter applies to backup servers, domain controller traffic, anti-virus servers, inventory management application, security information and event management servers, threat detection software, and the like. For Link Local IP Addresses, certain servers have a 169.254 Address and these connections need to be filtered out as they will extraneous data points. For self-traffic, some processes establish connections to themselves, which should be filtered out.

Once filters have been applied on the data 44, an SQL call or API call can be executed to provide the migration planning API 38 with the data 44 filtered for machine learning. The migration planning API 38 can utilize the filtered data as a web service for auto-grouping. The above filtering techniques may also be utilized for other predictive/machine learning aspects of the system 20.

Other examples of predictive grouping performed by the migration planning API 38 can include analysis of the culmination of nodes Sn in a migration pod Pn, predictive grouping based to optimize pod workload/sizing at source infrastructure, predicting which nodes Sn result in the greatest consolidation of resources, and the like.

Referring to FIG. 5, aspects of the software program 500 relating to auto-grouping or auto-podding are provided. Specifically, FIG. 5 shows an example screenshot of an "auto-podding" screen 602. This screen 602 provides user customization and graphics for the migration pods Pn generated according to the techniques described herein. In the example shown, the screen 602 displays a topology visualization 604 map, which can be shown in a window of the program 500. The topology visualization 604 graphically maps all of the computing nodes Sn identified for the selected migration pod Pn. In this example, the migration pod Pn includes several computing nodes Sn, which are servers and applications utilized by the servers. The topology visualization 604 displays each computing node Sn as a graphical node wherein at least one branch extends to/from another node Sn. The interdependencies between the nodes Sn are shown in a web-like framework.

The program 500 can be customized to change the orientation or reference position of the topology visualization 604. For example, certain nodes Sn can be selected to be the centralized origin of the topology visualization 604. Alternatively, the topology visualization 604 can be distributed, decentralized, or the like. Any of the nodes Sn can be selected in the topology visualization 604 to enable the user to see additional details about the selected computing node Sn, on demand. Such additional details include any of the data 44 described herein, as well as information derived from analysis of the data 44. The topology visualization 604 can be inspected for abnormalities, completeness of information, and the like.

In detail windows 606a, 606b the program 500 enables the user to see a running list of all the computing nodes Sn of this pod Pn shown in the topology visualization 604. For example, in window 606a, the program 500 shows the list of names for the applications of the pod Pn in addition to criticality parameter values for each given application, as described in detail herein. In window 606b, the various servers are shown by their respective names as well as their identifying IP addresses. The program 500 may also show criticality parameter values for each given server. The detail windows 606a, 606b may be configured in ways other than that shown.

At 608, the program enables a potential migration date to be specified for this pod Pn. This date may be stored in memory and used as a basis for later migration planning by the migration planning API 38. The migration planning API 38 may find the inputted date to be acceptable, or may otherwise overwrite the date with a different date. For example, the migration planning API 38 may determine that the inputted date is incompatible when other factors are considered in generation of migration plan.

At 610, a customization feature is provided by the program 500 to enable the user to customize criticality parameters or other values that may go into determination of the criticality parameters. For example, in early stages of machine learning, the auto-generation of the criticality parameters according to the techniques described herein may occasionally generate certain extraneous values until intelligence reaches a high degree of accuracy. Such extraneous values can be corrected by the customization feature 610. In another example, certain criticality parameter values may be close, but not ideal, given certain factors that have not been considered. Hence, the customization feature 610 enables tweaking of the criticality parameter values to set the desired value.

Figure 6:
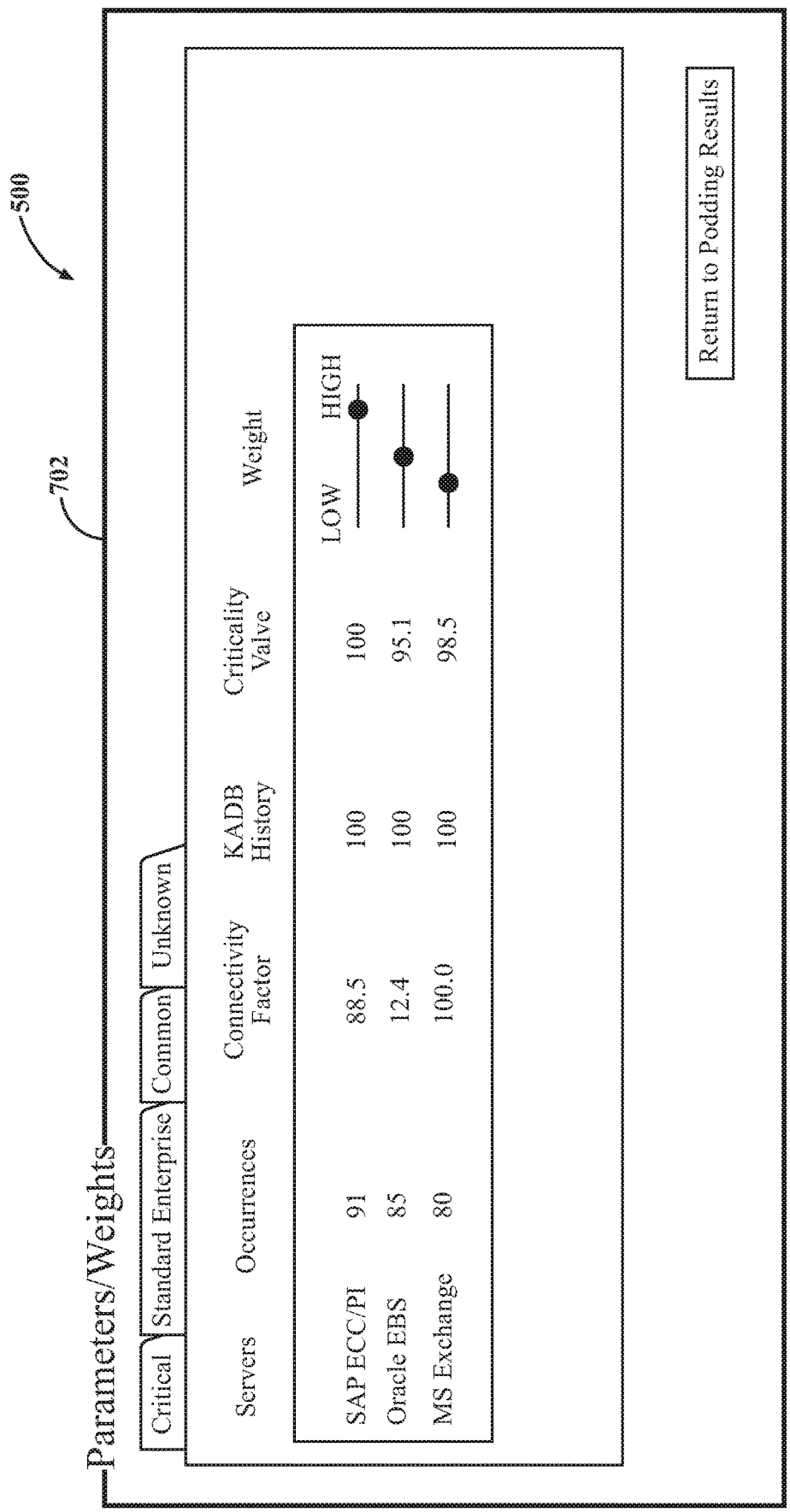
FIG. 6 is a sample screen of the software program for interfacing with and/or implementing certain aspects of criticality parameters according techniques described herein.

In one example, selection of the customization feature 610 button on the screen of FIG. 5, may trigger a weights/parameter customization screen 702, as shown in FIG. 6. The weights/parameter customization screen 702 enables a detailed examination of the factors that go into the criticality parameter values generated for each node Sn. In this example, the applications of the migration pod Pn are shown. For each application, values for the number of occurrences, connectivity factors, and KADB history are illustrated as certain factors that go into determination of the criticality values. KADB is Known Application Database, and is an application that has been fingerprinted and migrated in the past. Connectivity factors are the complexity factors that go into migrating this application stack. Number of Systems may also be document to show how many systems require this application to work correctly. Occurrences is how many times this application has been previously identified in discovery. Of course, any factors (actual or predictive) which go into determination of the criticality parameters other than those shown in FIG. 6 may be represented. The program 500 may provide a modifiable interface 704, such as a sliding bar, to enable the user to manually tweak any of the factors, or the criticality parameter for any of the computing nodes Sn, as described. For example, the modifiable interface 704 may be configured to decreases a value as the bar is moved to "low" or to increase a value as the bar is moved to "high". Of course, the modifiable interface 704 may be any type of interface other than a sliding bar, and the modifiable interface 704 may be enable tweaking of the values using other than a range, such as low to high. Upon completion of this screen 702, the user can return the auto-podding screen 602 of FIG. 5.

In FIG. 5, the program 500 further provides a confirmation feature 612 to allow the user to confirm acceptability of the pod Pn on the screen 602. Confirmation can enable this pod Pn to be tagged for prioritization processing by the migration planning API 38, as will be described below. In some examples, such confirmation may be done only for certain pods Pn requiring manual inspection. Otherwise, the migration planning API 38 may be configured to execute an error-checking algorithm for automatically determining whether the pod Pn is acceptable. Thereafter, the migration planning API 38 may auto-confirm the pod Pn for prioritization if the results of the error-checking algorithm are within an acceptable threshold level. The auto-podding screen 602 may have any configuration other than that shown in FIG. 5. Moreover, the migration planning API 38 may automate any manual process described in relation to auto-podding, or the features of FIG. 5.

C. Pod Prioritization

At step 248, the migration planning API 38 prioritizes the migration pods Pn. Prioritization is based on the criticality parameters of the discovered computing nodes Sn of the migration pods Pn. Prioritization may be based on some, or all of the nodes Sn of each pod Pn. Prioritization may also be aggregated based on some or all of the nodes Sn of the migration pods Pn. Furthermore, the migration planning API 38 can prioritize computing nodes Sn for any given pod Pn based on these techniques.

Prioritizing may include determining which pods to migrate Pn first or last, if/when to migrate certain pods Pn before others, how to migrate certain pods Pn, where to migrate certain pods Pn, and the like. Factors that the migration planning API 38 takes into account for prioritization include any of the actual or predictive factors described above with respect to data analysis and node grouping.

Prioritization may be derived from actual discovered data 44 or past data 242, 244. Examples of such factors include, but are not limited to any one or combination of the following: migration risk of pods, criticality of pods to migration, qualitative/quantitative use of pods, complexity of pods, importance of pod to initially developing target infrastructure 26, cost/economic factors related to migration, or the like. The migration planning API 38 may further take into account prioritizations determined from past migration planning to optimize a current prioritization.

The migration planning API 38 may input several prioritization parameters into a prioritization algorithm to determine the priority of the pods Pn. The prioritization algorithm may be enabled by any one or more of the following techniques: weighted averaging, sorting (simple, bubble, distribution), and the like.

For example, the migration planning API 38 may categorize criticality for pods Pn into several groups (e.g., catastrophic, critical, moderate, negligible). Then, for each pod Pn, a migration impact score can be computed based on a weighted average applied to several inputted factors, as described. The impact score is used to rank an impact of one migration pod Pn relative to the impacts of other migration pods Pn. For example, the pod Pn with the highest impact score is ranked first in priority, with the next highest impact score ranked second in priority and so forth. Each criticality category may define a range or value. The outputted migration impact score for each pod Pn is then compared to the range or value of the criticality category to determine the categorization of the pod Pn. Ranking can occur based on the resulting pod Pn categorization. Additionally or alternatively, criticality thresholds may be utilized in conjunction with any of the techniques described herein. Prioritization is an important feature because prioritization provides insight about what systems are high priority to the enterprise based on the traffic numbers. Prioritization could happen by executable and port.

Prioritization can be an entirely automated process requiring no user intervention. In other examples, some manual input can be provided to tweak or override the automated prioritization determined by the migration planning API 38.

Prioritization techniques other than those specifically described herein are contemplated and may be employed.

D. Planning and Reporting

With the nodes Sn grouped into pods Pn, and having the pods Pn prioritized, the migration planning API 38, at step 250, generates a plan for migrating one or more migration pods Pn to the target infrastructure 26.

The migration plan may be generated in a data table in a computer-readable digital format and/or be rendered on a software program 500 or GUI that is visible to the IT migration planning service provider or enterprise.

The migration plan defines how, when and where to execute the migration as well as parameters for the migration. Factors to be considered by the migration planning API 38 in generating the plan include, but are not limited to, any one or more of the following: the dependencies of the nodes Sn, prioritization of pods Pn, availability of resources at target infrastructure 26, computing node Sn life cycles, migration cost, viability of migration, prioritization of which pods Pn is required first, implications of pods Pn on other projects or activities, development of the target infrastructure 26, cost estimates for migration, approval or authorizations to migrate, and the like.

In the course of migration planning, the migration planning API 38 may generate the topology visualization 604', such as the one described above, to illustrate planned topology of the computing nodes Sn at the target infrastructure 26 as a result of migration. The topology visualization 604', may show all the pods Pn in the aggregate, to show a full-scale topology at the target infrastructure 26. The plan may modify individual migration pods Pn based on intelligent and automated optimizations.

The migration plan may be based on current results and data 44 for the computing nodes Sn, and may additionally be based on past migration planning data 244. In other words, the migration planning API 38 may consider experiences for past migrations to make predictive suggestions/modifications to the plan, as shown at step 252 in FIG. 2B.

Past migration planning data 244 may also take into account pre and post communication profiles for computing nodes Sn. In other words, the communication profile of the computing node Sn may change after migration. Such changes can be stored as past migration planning data 244. The migration planning API 38 can intelligently take into account these communication profile changes to make suggestions/recommendations for the migration plan that otherwise could not be recognized manually.

In one example, the migration planning API 38 is configured to suggest improvements for optimization at the target infrastructure 26. Such optimizations can relate to system architecture, sizing of disks or RAM, CPU configurations, processor suggestions, conversion of a physical system into a virtual system, and the like.

In other examples, the migration planning API 38 can identify applications installed on the one or more discovered computing nodes Sn and analyze relevance of the identified applications with respect to the target infrastructure 26. For example, given the planned strategy for the target infrastructure 26, the migration planning API 38 may intelligently determine that one application can be consolidated by presence of another application. The migration planning API 38 can predictively suggest removal of one or more of the identified applications based on the analyzed relevance. This way, the application is removed from the migration plan and will not be implemented at the target infrastructure 26. Examples of applications that are suitable candidates for such removal include, but are not limited to, anti-virus programs, backup agents, SIEM solutions, and asset management utilities.

In another example, the migration planning API 38 can automatically suggest one or more of security recommendations, firewall rules, system sizing requirements, and cost estimations for the discovered computing nodes Sn to be migrated to the target infrastructure 26. Again, such recommendations can be based on past migration planning data 244. The migration planning API 38 may have a set of rules and apply the migration plan to the rules to determine whether a recommendation is suitable.

The migration planning API 38 may also be configured with a scenario planning module or mechanism to determine or weigh different scenarios for migration at the target infrastructure 26, as well as the consequences/results of executing each scenario. In turn, the migration planning API 38 provides a future-looking "what if" analysis for the plan based upon potential future locations (firewall rules, system sizing data, security recommendations, price forecasting). Forecasting may include predicting what nodes Sn may break down and cause downtime prior to migrations.

The program 500 may provide different visualizations to show outcomes of each scenario for enabling user selection of the best outcome. These scenarios can be graphically overlaid to illustrate topology and criticality for each plan for purposes of network design and lowering risk of migration.

Examples of predictive planning other than those described above are contemplated and can be executed by the migration planning API 38.

The migration plan may also automatically generate a schedule for the planned migration. The migration planning API 38 may analyze the pod Pn priorities, criticality, and complexity to auto-generate the schedule. The schedule identifies what pods Pn should be migrated and when such pods Pn should be migrated. Thus, the migration planning API 38 is configured to provide phased migration scheduling for optimization of the migration. Depending on the appropriate methods, perform the migration and document every step.

The migration planning API 38 may be configured to automatically communicate with the enterprise to inform the enterprise that certain migration phases are upcoming (based on the schedule) and that certain systems may be affected or shut down. Such communications can occur through a customer portal 66, as shown in FIG. 1. The portal 66 may provide the enterprise with a secure remote access service, supported by cloud computing, to enable the enterprise to connect to a website for viewing any of the aspects of the migration discussed herein. For example, through the portal 66, an agent of the enterprise can query the migration planning API 38 for the latest data available, etc.

The migration planning API 38 may also communicate with the CMDB 68. The CMDB 68 can provide project management tools to gather information about migrations for team members of the IT service provider for enabling the team members to remain informed of the migration process. This way, if members of the IT service provider team are newly added, the CMDB 68 quickly enables the new members to understand how the migration process is progressing and where the process currently stands.

Figure 7:
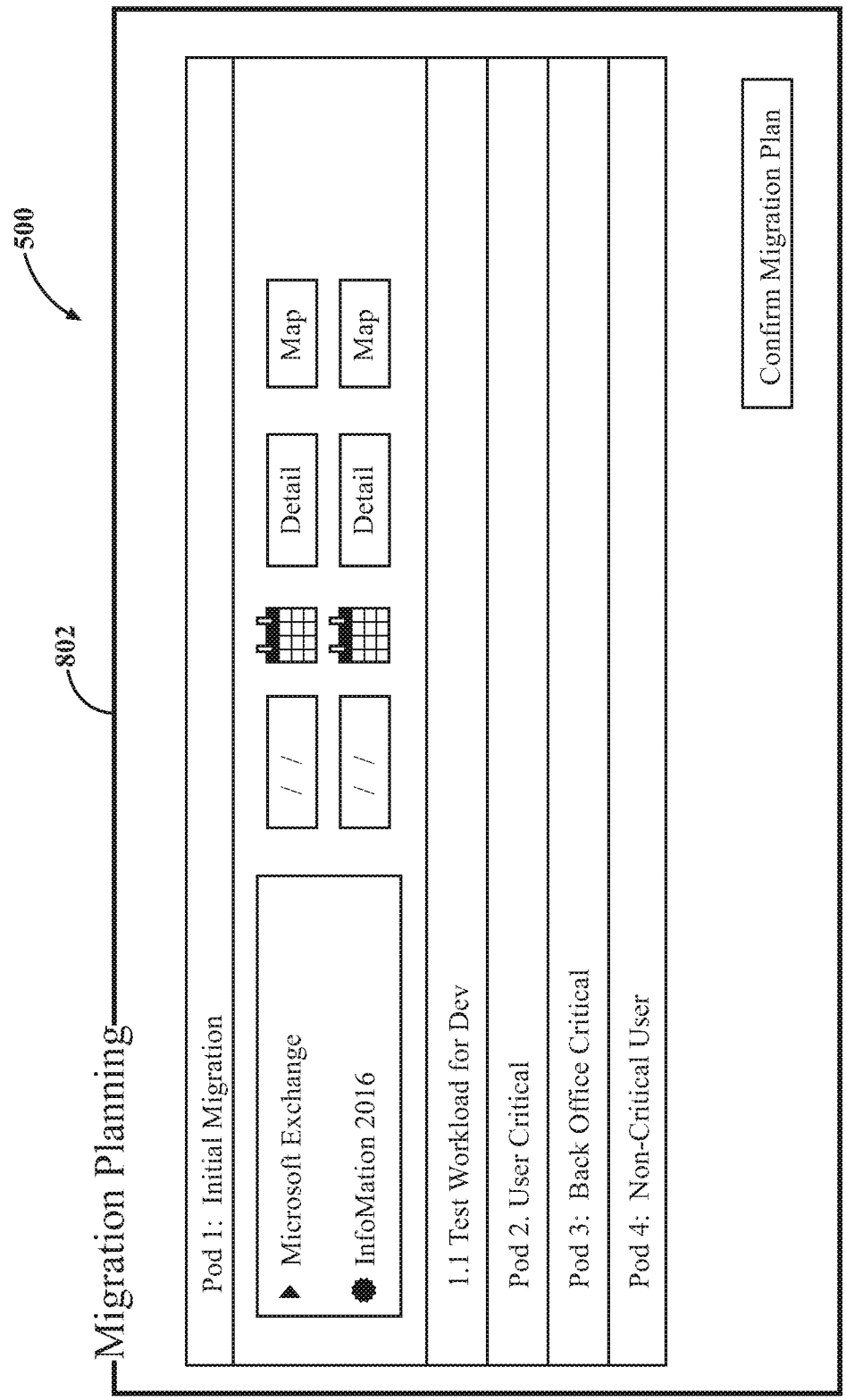
FIG. 7 is a sample screen of the software program for interfacing with and/or implementing certain aspects of migration planning according techniques described herein.

Referring to FIG. 7, a migration-planning screen 802 of the program 500 is provided. The migration planning screen 802 allows the user to view the various pods Pn that are slated for migration, as well as prioritizations, visualizations, and details relating to the same. In this example, Pod 1 is the pod for initial migration and is the highest priority pod Pn. Pod 4 is a non-critical user pod and the lowest priority pod Pn. Here, Pod 1 is selected and the program 500 provides more detailed information for the selected pod. The user can examine the computing nodes Sn for the selected pod Pn as well as any of the aforementioned details about the pod Pn. Furthermore, the migration-planning screen 802 enables modification of migration scheduling.

Figure 8:
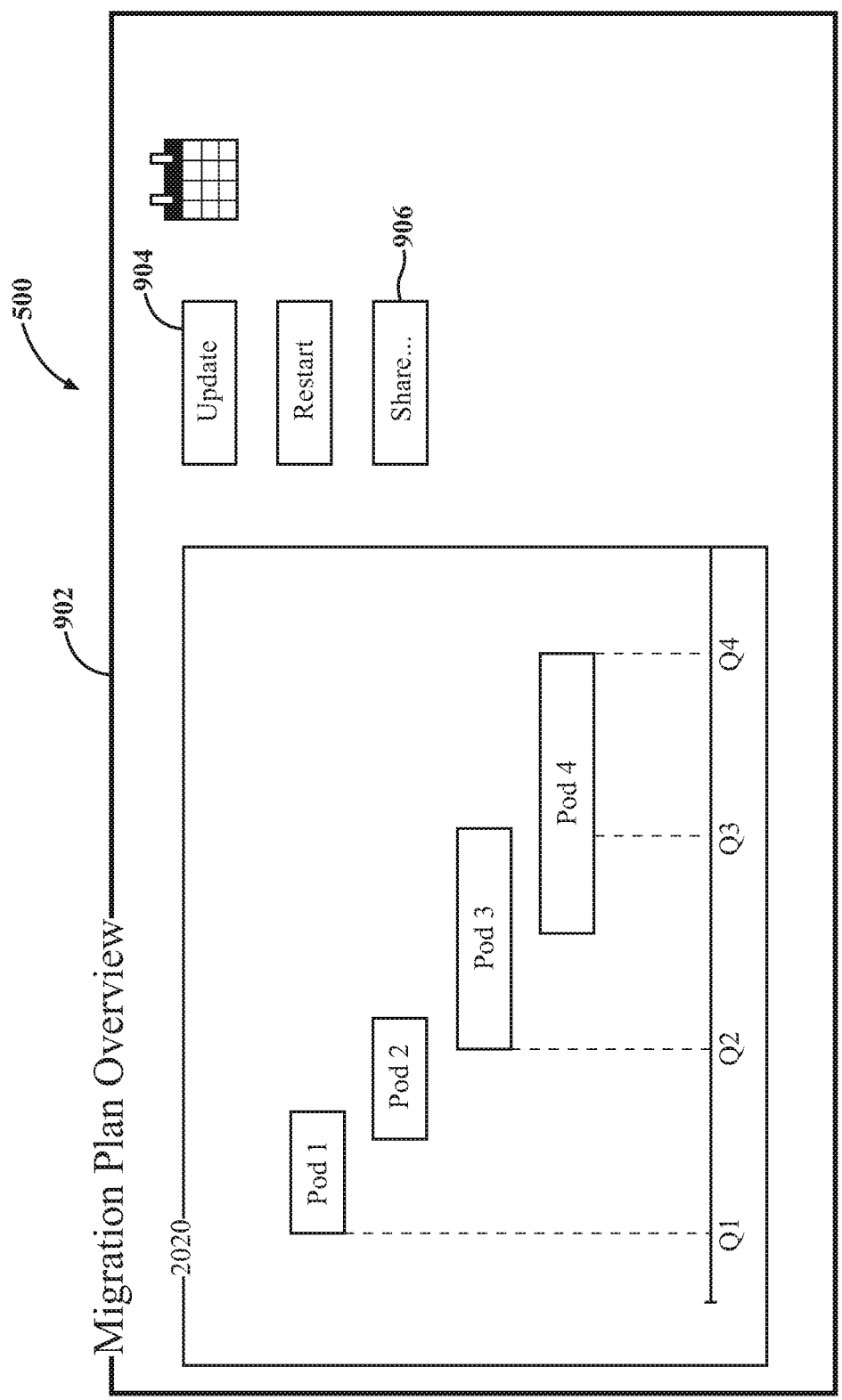
FIG. 8 is a sample screen of the software program for interfacing with and/or implementing certain aspects of migration scheduling according techniques described herein.

If the migration plan is confirmed on the planning screen 802, the program 500 triggers a plan overview screen 902, as shown in FIG. 8. The plan overview screen 902 shows a visualization of the phased migration schedule, as generated by the migration planning API 38. In one example, as shown, each phase of the migration is shown with a horizontal bar chart and is identified by the pods that are subject to each phase. The bar chart for each phase extends along a horizontal axis of time. In this case, the aforementioned pods 1-4 in the example of FIG. 7 are slated for phased migration starting with Pod 1 in the first quarter of 2020 and ending migration with Pod 4 at the end of the year. Notably, the phases may overlap such that more than one phase is migrated simultaneously. Any of the phases may be updated or tweaked using an update button 904. Moreover, the program 500 may be configured to use the plan overview screen 902 to display how the difference scenarios may influence migration scheduling. For instance, the schedule resulting from the various scenarios may be overlaid on the visualization, or may be toggled, to show a user which scenario is optimal for migration.

Accordingly, migration planning can be completely automated or may include some manual intervention. The program 500 is configured to record data entry points identifying people and teams involved in any manual migration effort for audit trail and resource planning purposes.

Of course, the visualization shown in FIG. 8 is only one of many examples of how the plan overview screen 902 may enable visualization of the migration plan. Any of the graphics described herein may be animated, video, or audiovisual for added engagement.

If the migration overview is suitable, the plan may be reported using a share button 906. Reporting may include any and all information described herein (data, computing nodes, pods, criticality, etc.) that may be relevant to understand each scheduled migration phase. Reporting may also include generating validation packs for purposes of sizing and preparing the target infrastructure 26 based any one or more pods Pn. The reporting tool can also show dependencies, and data that are actionable for migration. Automatic notifications and dashboard for visibility into previous, current, and future state of the environment with planning notes can also be reported.

In one embodiment, the migration planning API 38 communicates with a computing reporting service, such an SQL Server Reporting Services (SSRS) to generate and communicate the report. Reporting may be presented in a GUI or the program 500 accessible from the frontend site 51 or from the reporting/analytics module 63. The report may be communicated to the CMDB 68 to distribute the report to members of the IT team or to the portal 66 for the review by the enterprise. In some instances, the reporting service may directly access the migration database 36 to access any of the aforementioned data or saved parameters relating to the migration or components thereof.

Several embodiments have been described in the foregoing description. However, the embodiments discussed herein are not intended to be exhaustive or limit the invention to any particular form. The terminology, which has been used, is intended to be in the nature of words of description rather than of limitation. Many modifications and variations are possible in light of the above teachings and the invention may be practiced otherwise than as specifically described.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A computer-implemented method for discovery of computing nodes of a source infrastructure at a source location and for planning migration of the computing nodes to a target infrastructure at a target destination, the method comprising:

deploying a collector node at a network of the source location;

discovering, with the collector node, data associated with computing nodes of the source infrastructure;

transmitting, with the collector node, the discovered data from the network of the source location to a staging application programming interface (API) at a remote server;

receiving, with the staging API, the discovered data transmitted by the collector node;

applying, with the staging API, an access control measure to the discovered data;

satisfying, with a migration processing API, the access control measure applied by the staging API;

retrieving, with the migration processing API, the discovered data from the staging API after satisfying the access control measure;

writing, with the migration processing API, the discovered data to a migration database;

analyzing, with a migration planning API, the discovered data written to the migration database by:
  filtering, with the migration planning API, the discovered data stored in the migration database to filter out common connection data from the discovered data, the common connection data including data relating to at least one of infrastructure services, link local IP addresses, or self-traffic, and
  applying, with the migration planning API, a criticality algorithm to the discovered data to determine a criticality parameter associated with each of the discovered computing nodes based on a number of occurrences of the computing node, a number of systems that depend on the computing node according to the filtered discovered data, and a user-entered weight assigned to the computing node that indicates a relative importance of the computing node, wherein the criticality parameter identifies a potential impact that each discovered computing node has to migration;

automatically grouping, with the migration planning API, the discovered computing nodes of the source infrastructure into migration pods based on dependency of the computing nodes according to the filtered discovered data, the criticality parameters associated with the computing nodes, and predictive analytics based on past discovered data associated with computing nodes from past planned migrations that are similar to the discovered computing nodes that suggest one or more of the discovered computing nodes to include in one of the migration pods and suggest one or more of the discovered computing nodes to exclude from one of the migration pods, and with each migration pod defining a group of discovered computing nodes that depend on one another for network communication at the source infrastructure;

prioritizing, with the migration planning API, the migration pods based on the criticality parameters of the discovered computing nodes of each migration pod; and generating, with the migration planning API, a plan for migrating the migration pods to the target infrastructure based on the prioritization of the migration pods.

2. The computer-implemented method of claim 1, wherein deploying the collector node is an agentless process comprising deploying the collector node as a virtual appliance at the network of the source location such that no agent is installed at the network of the source location.

3. The computer-implemented method of claim 1, further comprising the collector node:
periodically scanning the computing nodes of the source infrastructure for modifications after initially discovering data associated with the computing nodes;
identifying one or more of the computing nodes that have been modified; and
re-discovering data associated with modified computing nodes.

4. The computer-implemented method of claim 1, further comprising the collector node executing an adaptation algorithm wherein the collector node performs the steps of:
determining whether a computing node is reachable over the network;
identifying an operating system utilized by the computing node;
selecting one of a plurality of network protocols, the selected network protocol corresponding to the identified operating system; and
executing, over the selected network protocol, a network statistics process for discovering data associated with the computing node.

5. The computer-implemented method of claim 1, further comprising:
linking a credential manager to the collector node;
inputting into the collector node, from the credential manager, credentials data for the computing nodes of the source infrastructure;
validating, with the collector node, the computing nodes of the source infrastructure based on the credentials data; and
wherein discovering, with the collector node, data associated with computing nodes of the source infrastructure occurs only for computing nodes of the source infrastructure that have been validated based on the credentials data.

6. The computer-implemented method of claim 1, wherein the discovered data is provided in a plurality of different source formats, and further comprising the migration processing API:
normalizing the discovered data by applying a set of rules to the discovered data to transform the discovered data from the plurality of different source formats into a single target format; and
writing the normalized discovered data to the migration database.

7. The computer-implemented method of claim 1, wherein:
transmitting, with the collector node, the discovered data from the network of the source location to the staging API further comprises transmitting a JSON file and metadata related to the discovered data;
receiving, with the staging API, the discovered data transmitted by the collector node further comprises receiving the JSON file and metadata; and
further comprising the staging API:
sending the JSON file to a shared folder; and
sending the metadata to a service bus; and
further comprising the migration processing API:
reading the JSON file from the shared folder; and
reading the metadata from the service bus to consume a message defining properties for processing of the discovered data by the migration processing API.

8. The computer-implemented method of claim 1, wherein automatically grouping is further defined by the migration planning API linking the computing nodes of each migration pod to require collective migration of the computing nodes of each migration pod and to prohibit individual migration of any computing node of each migration pod.

9. The computer-implemented method of claim 1, further comprising the migration planning API:
applying the criticality algorithm to the discovered data to determine a complexity parameter associated with each migration pod, wherein the complexity parameter identifies complexity of dependency of the group of discovered computing nodes of each migration pod; and
prioritizing the migration pods based on the complexity parameters of the migration pods.

10. The computer-implemented method of claim 1, further comprising the migration planning API:
applying the criticality algorithm to determine the criticality parameter associated with each of the discovered computing nodes by modeling and querying heuristics to identify or predict security risks associated with one or more of the discovered computing nodes; and
automatically grouping one or more of the discovered computing nodes having security risks associated therewith into migration pods to minimize risk to other discovered computing nodes having no security risks associated therewith.

11. The computer-implemented method of claim 1, further comprising the migration planning API utilizing predictive analytics in conjunction with applying the criticality algorithm by analyzing past discovered data associated with computing nodes from past planned migrations that are similar to the discovered computing nodes to make a predictive determination regarding the criticality parameters of the discovered computing nodes.

12. The computer-implemented method of claim 11, further comprising the migration planning API predictively determining dependency between discovered computing nodes based on predictive analysis of the past discovered data.

13. The computer-implemented method of claim 11, further comprising the migration planning API automatically grouping the discovered computing nodes of the source infrastructure into migration pods by predictively determining a latency impact that two or more discovered computing nodes will have on planned migration if separated into different migration pods based on predictive analysis of the past discovered data.

14. The computer-implemented method of claim 11, further comprising the migration planning API automatically grouping the discovered computing nodes of the source infrastructure into migration pods by predictively determining a likelihood of migration failure if two or more of the discovered computing nodes are included in a same migration pod based on predictive analysis of the past discovered data.

15. The computer-implemented method of claim 1, wherein generating the plan for migrating the migration pods to the target infrastructure further comprises the migration planning API identifying applications installed on the discovered computing nodes, analyzing relevance of the identified applications with respect to the target infrastructure, and suggesting removal of one or more of the identified applications at the target infrastructure based on the analyzed relevance.

16. The computer-implemented method of claim 1, wherein generating the plan for migrating the migration pods to the target infrastructure further comprises the migration planning API automatically suggesting security recommendations, firewall rules, system sizing requirements, and cost estimations for the discovered computing nodes to be migrated to the target infrastructure.

17. The computer-implemented method of claim 1, wherein generating the migration plan further comprises the migration planning API generating a topology visualization displayable with a graphical user interface wherein the topology visualization illustrates planned topology of the computing nodes at the target infrastructure as a result of migration.

18. The computer-implement method of claim 3, further comprising the collector node:
   initially discovering the data associated with the computing nodes using a bulk scan; and
   periodically scanning a subset of the computing nodes of the source infrastructure predicted to change based on predictive analysis of the past discovered data for modifications after the initial discovery,
   wherein the identified one or more computing nodes that have been modified are part of the subset of the computing nodes.

19. The computer-implemented method of claim 10, further comprising the migration planning API excluding one or more of the discovered computing nodes from one of the migration pods to minimize risk to one or more other of the discovered computing nodes included in the one of the migration pods.

20. A computer-implemented system for discovery of computing nodes of a source infrastructure at a source location and for planning migration of the computing nodes to a target infrastructure at a target destination, the system comprising:
   a collector node configured for deployment at a network of the source location and being configured to discover data associated with computing nodes of the source infrastructure and to transmit the discovered data from the network of the source location;
   a staging application programming interface (API) configured to receive the discovered data transmitted by the collector node and apply an access control measure to the discovered data;
   a migration database;
   a migration processing API being configured to satisfy the access control measure applied by the staging API, retrieve the discovered data from the staging API after satisfying the access control measure, and write the discovered data to the migration database; and
   a migration planning API being configured to:
      analyze the discovered data written to the migration database;
      filter the discovered data stored in the migration database to filter out common connection data from the discovered data, the common connection data including data relating to at least one of infrastructure services, link local IP addresses, or self-traffic;
      implement a criticality algorithm to the discovered data to determine a criticality parameter associated with each of the discovered computing nodes based on a number of occurrences of the computing node, a number of systems that depend on the computing node according to the filtered discovered data, and a user-entered weight assigned to the computing node that indicates a relative importance of the computing node, wherein the criticality parameter identifies a potential impact that each discovered computing node has to migration;
      automatically group the discovered computing nodes of the source infrastructure into migration pods based on dependency of the computing nodes according to the filtered discovered data, the criticality parameters associated with the computing nodes, and predictive analytics based on past discovered data associated with computing nodes from past planned migrations that are similar to the discovered computing nodes that suggest one or more of the discovered computing nodes to include in one of the migration pods and suggest one or more of the discovered computing nodes to exclude from one of the migration pods, and with each migration pod defining a group of discovered computing nodes that depend on one another for network communication at the source infrastructure;
      prioritize the migration pods based on the criticality parameters of the discovered computing nodes of each migration pod; and
      generate a plan for migrating the migration pods to the target infrastructure based on the prioritization of the migration pods.

* * * * *